(12) United States Patent
Hibbert

(10) Patent No.: US 9,293,068 B1
(45) Date of Patent: Mar. 22, 2016

(54) AMBIGRAM COIN AND KIT

(71) Applicant: Laura Ann Hibbert, Lakewood, WA (US)

(72) Inventor: Laura Ann Hibbert, Lakewood, WA (US)

( * ) Notice: Subject to any disclaimer, the term of this patent is extended or adjusted under 35 U.S.C. 154(b) by 4 days.

(21) Appl. No.: 14/480,634

(22) Filed: Sep. 9, 2014

(51) Int. Cl.

| G09F 3/02 | (2006.01) |
|---|---|
| A44C 25/00 | (2006.01) |
| A01K 27/00 | (2006.01) |
| A44B 15/00 | (2006.01) |
| B23K 10/00 | (2006.01) |
| A44C 21/00 | (2006.01) |

(52) U.S. Cl.
CPC ............... *G09F 3/02* (2013.01); *A01K 27/006* (2013.01); *A44B 15/00* (2013.01); *A44C 25/007* (2013.01); *B23K 10/006* (2013.01); *A44C 21/00* (2013.01)

(58) Field of Classification Search
CPC ............................. A44C 21/00; A44C 25/007
USPC .......................................................... 40/27.5
See application file for complete search history.

(56) References Cited

U.S. PATENT DOCUMENTS

| 1,936,378 | A | * | 11/1933 | Carr | ........................ F16G 15/08 |
|---|---|---|---|---|---|
| | | | | | 24/574.1 |
| 2,666,305 | A | * | 1/1954 | Wittmayer | ............... A44C 9/00 |
| | | | | | 63/15 |
| 5,052,195 | A | | 10/1991 | Lunt | |
| 5,157,945 | A | | 10/1992 | Giehl | |
| 5,203,183 | A | | 4/1993 | Salerno | |
| 5,588,310 | A | | 12/1996 | Lai | |
| 5,713,218 | A | * | 2/1998 | McCabe | ............... A44C 5/0053 |
| | | | | | 132/246 |
| D411,476 | S | | 6/1999 | Henderson | |
| 6,205,816 | B1 | | 3/2001 | Lu | |
| 7,096,690 | B2 | | 8/2006 | James | |
| 7,155,933 | B2 | | 1/2007 | Pourmehdi | |
| 7,254,962 | B2 | * | 8/2007 | Scharr | .................... A44C 5/185 |
| | | | | | 63/33 |
| 7,322,213 | B2 | | 1/2008 | Tamir et al. | |
| 7,412,847 | B2 | | 8/2008 | Huang | |
| 2006/0102445 | A1 | * | 5/2006 | Jenrick | .................... G07D 9/04 |
| | | | | | 194/350 |
| 2012/0174626 | A1 | * | 7/2012 | Larson | ................. A44C 11/002 |
| | | | | | 63/3.1 |

OTHER PUBLICATIONS

Shapeways Heads or Tails ambigram coin, Dec. 17, 2013, http://www.shapeways.com/product/LNPSX75UB/heads-or-tails-ambigram-coin, pp. 1-5.*
Shapeways Ambigram Coin, Apr. 30, 2014, http://www.shapeways.com/product/4BJJNGXDV/ambigram-coin?li=more-from-shop&optionId=19382390&rc=MoreFromDesigner, pp. 1-5.*

(Continued)

*Primary Examiner* — Kristina Junge
(74) *Attorney, Agent, or Firm* — Patentpending, PLLC; Elizabeth Reilly

(57) ABSTRACT

An ambigram coin comprises a coin body including a field having an obverse side, a reverse side, bound by a circumferential edge side, a central portion including a cut-out hollow ambigram legend therethrough. The ambigram coin includes two opposing cut-out hollow apertures that provide an opening through which a displaying device is passed therethrough. The ambigram coin includes a cut-out ambigram including the hollow letters "M" and "E", ambigram "ME" at an obverse display position such that when the ambigram coin is vertically rotated symmetrically 180 degrees the cut-out ambigram "ME" reads as the cut-out ambigram "WE", at a reverse display position. In another aspect, a kit is provided that includes an ambigram coin kit. In another embodiment, the ambigram coin further comprises a displaying device coupled to a connecting device so that the ambigram coin is used worn as jewelry.

40 Claims, 14 Drawing Sheets

(56) References Cited

OTHER PUBLICATIONS

United States Mint, Connecting America Through Coins, "About the Mint", http://www.usmint.gov/about_the_mint/corner/index.cfm?action=Anatomy_of_a_coin, 2014, 4 pgs.

United States Mint, Connecting America Through Coins, "US Mint Catalog Online", Coins, http://usmint.gov/shop/coins/?, 2014, 1 page.

United States Mint, Connecting America Through Coins, "How Coins Are Made" http://www.usmint.gov/about_the-mint/collectors_corner/index=Anatomy_of_a_coin, 2014, 6 pgs.

* cited by examiner

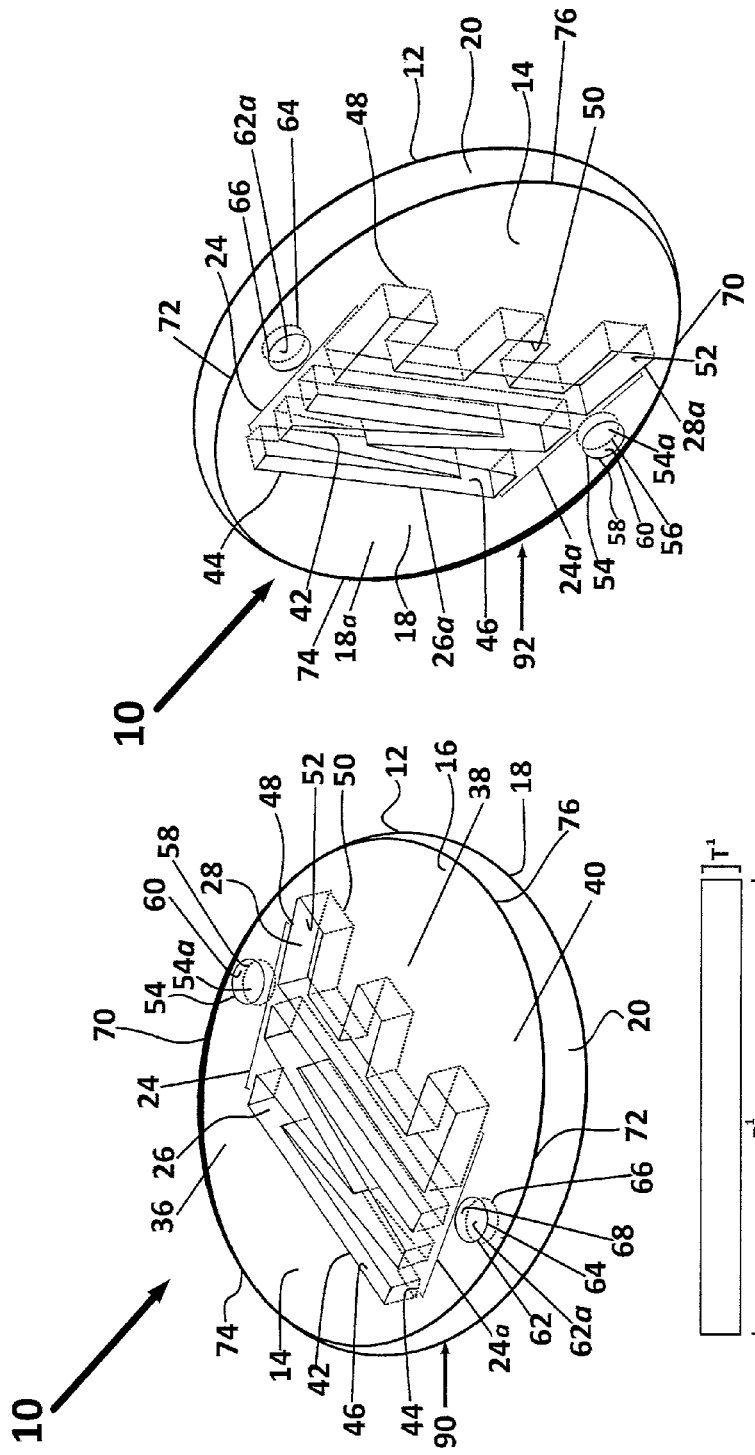

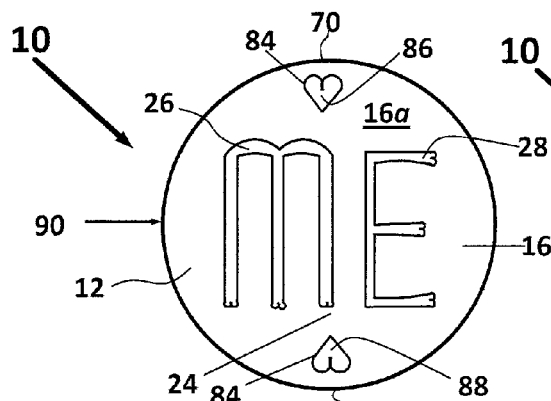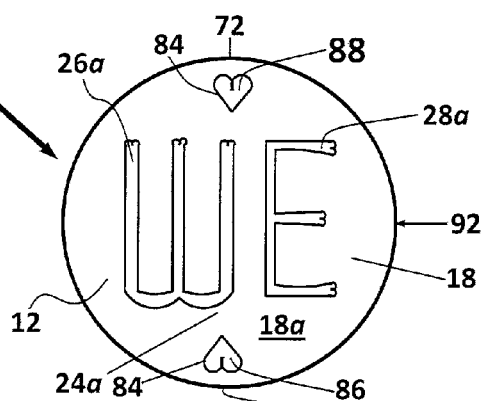
FIG. 4A  FIG. 4B
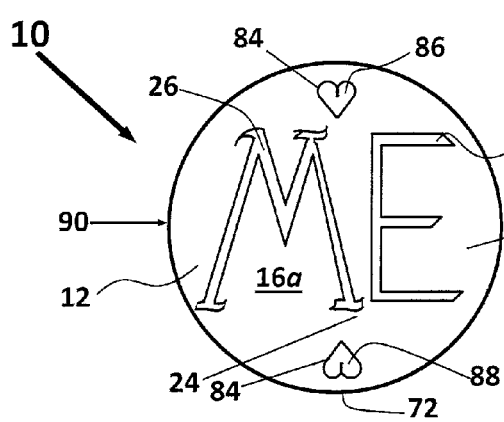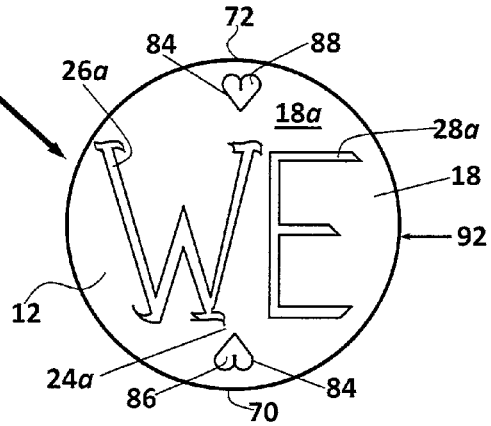
FIG. 5A  FIG. 5B
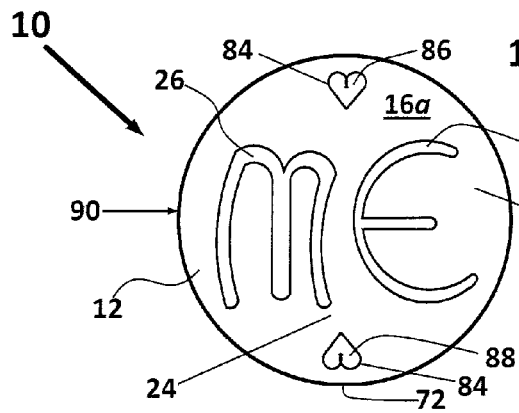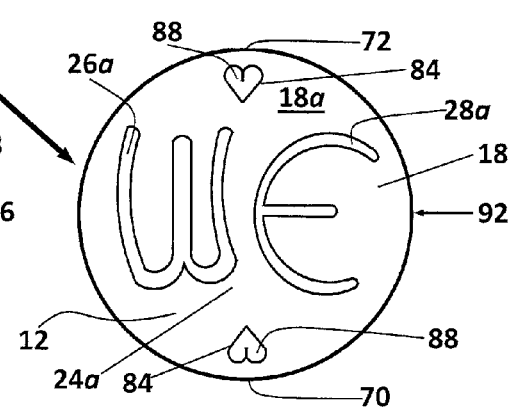
FIG. 6A  FIG. 6B

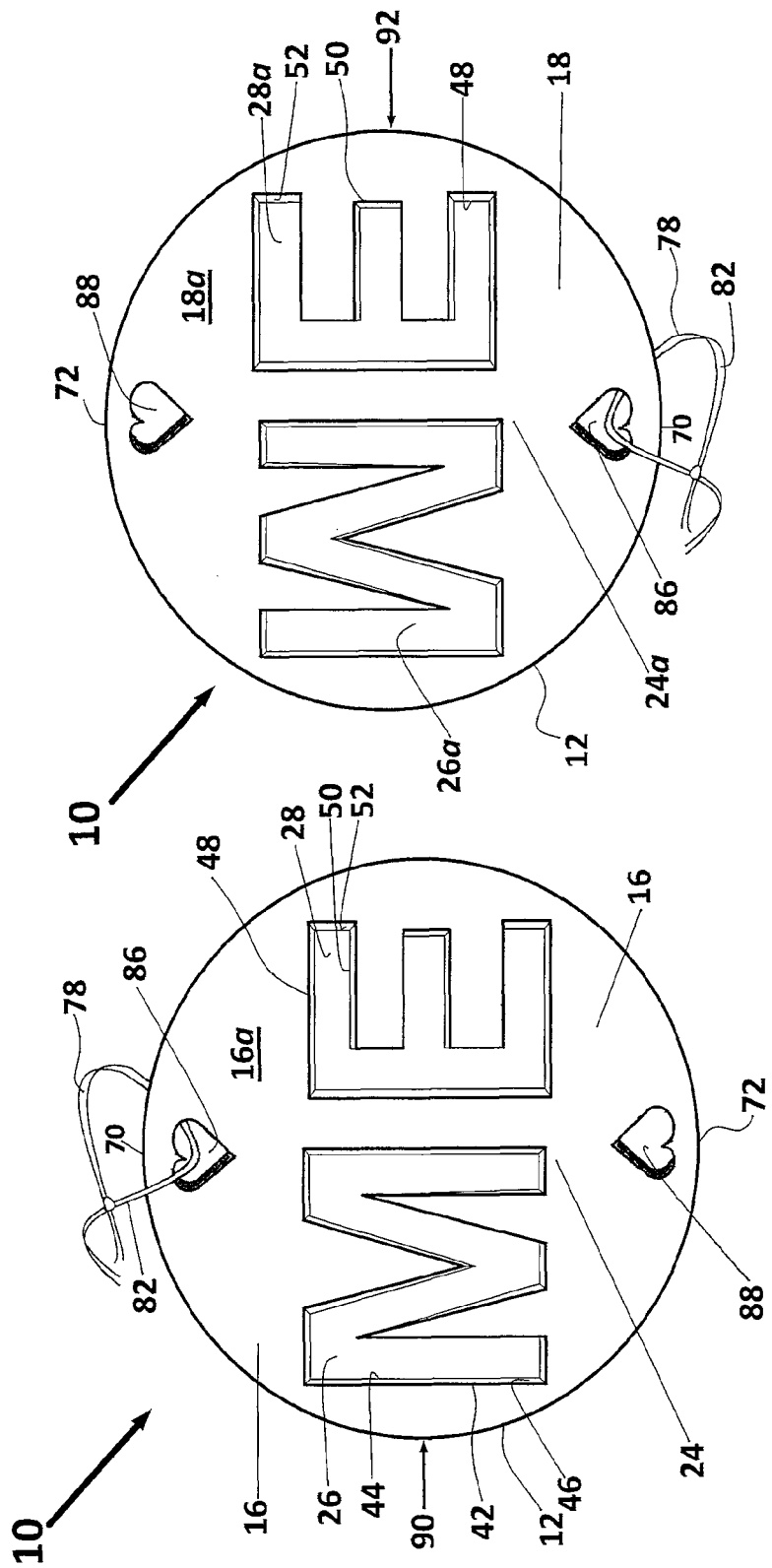

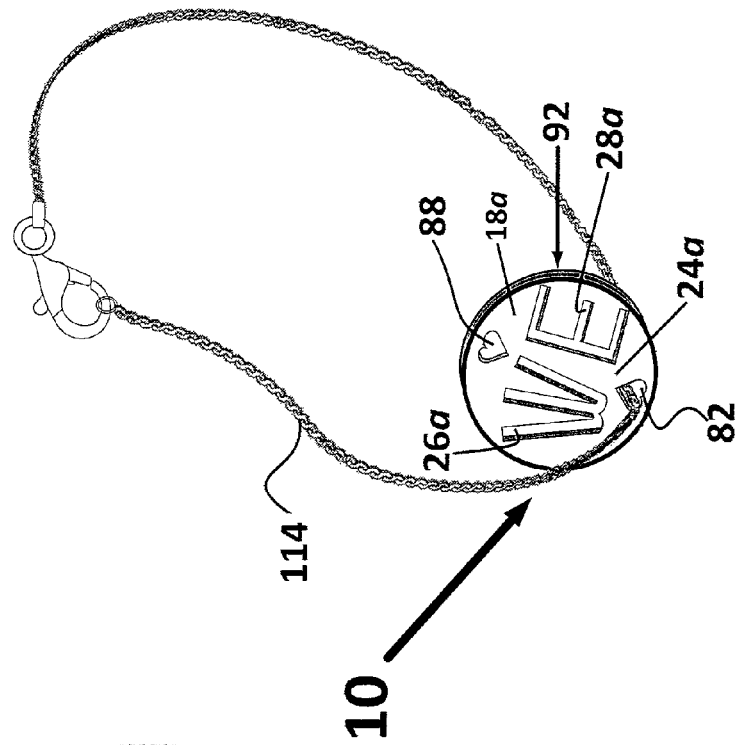
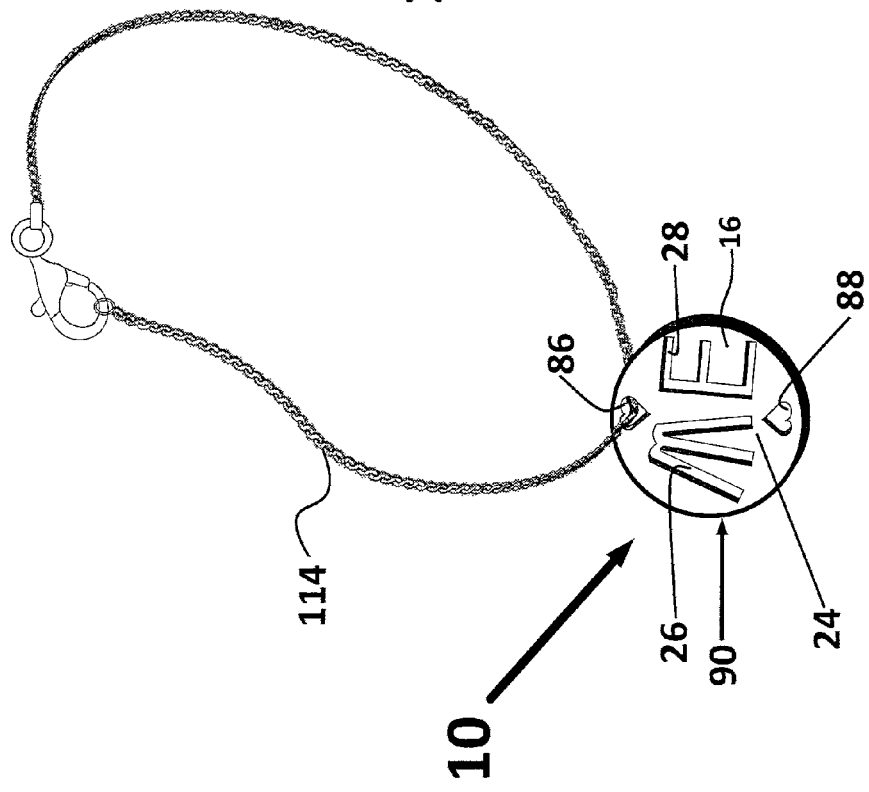

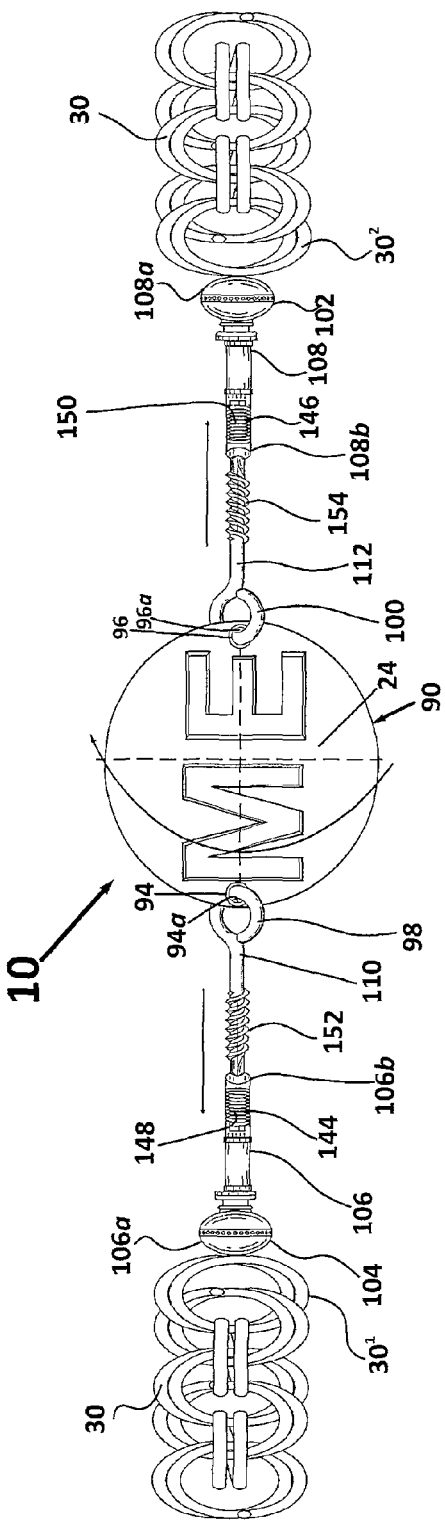
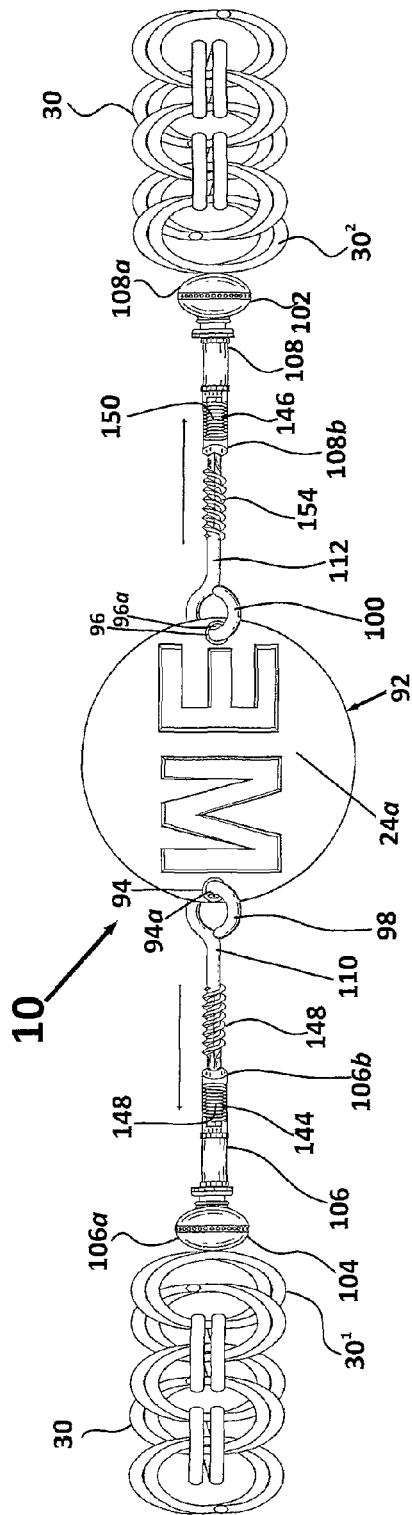
FIG. 11A
FIG. 11B

FIG. 14
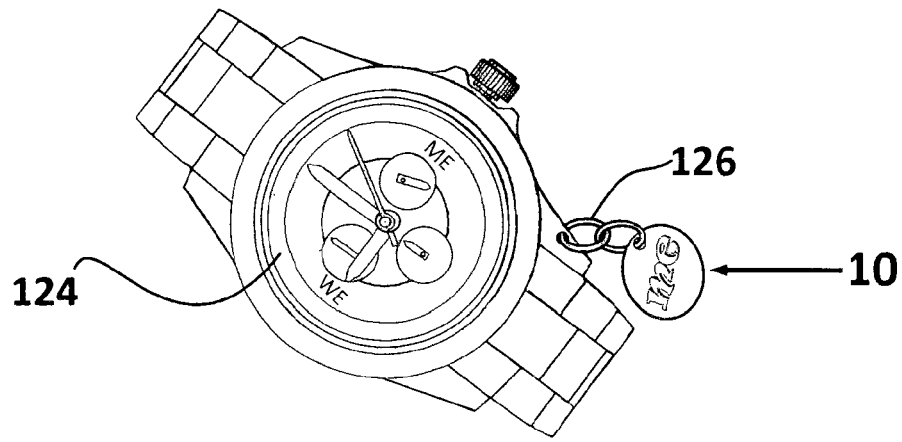
FIG. 15A  FIG. 15B
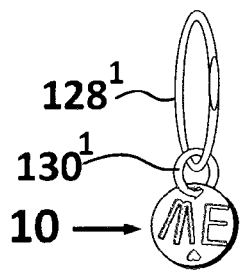 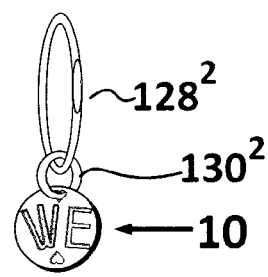
FIG. 16
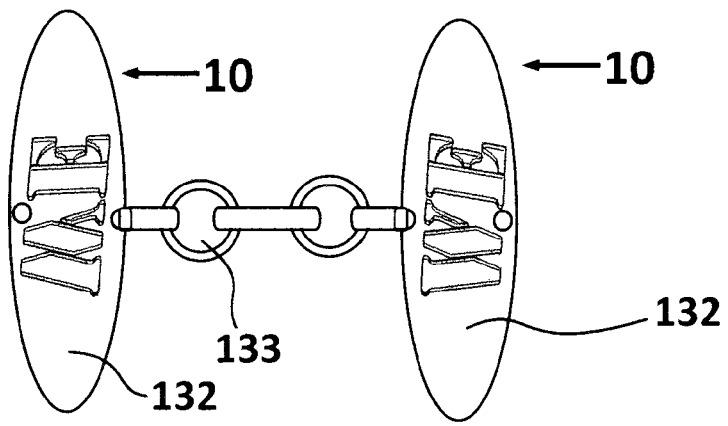

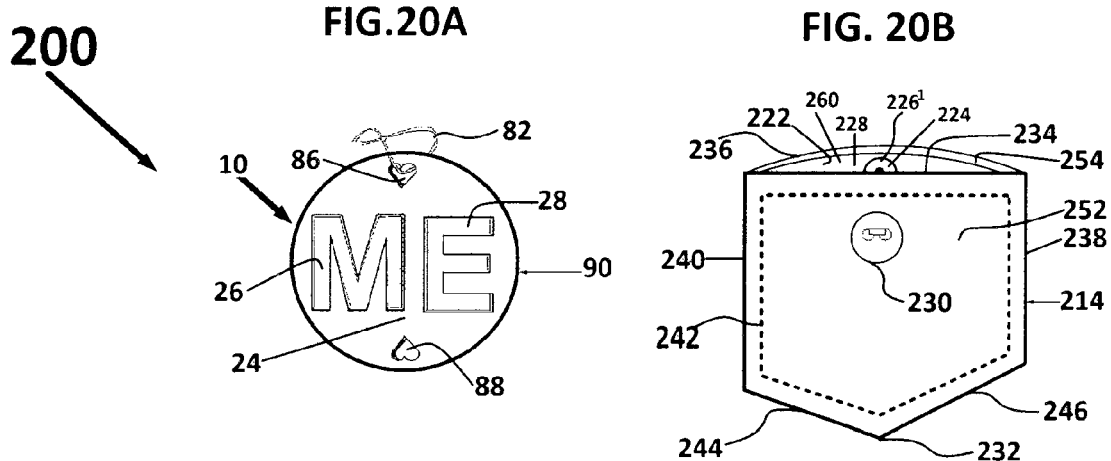
FIG. 20A
FIG. 20B
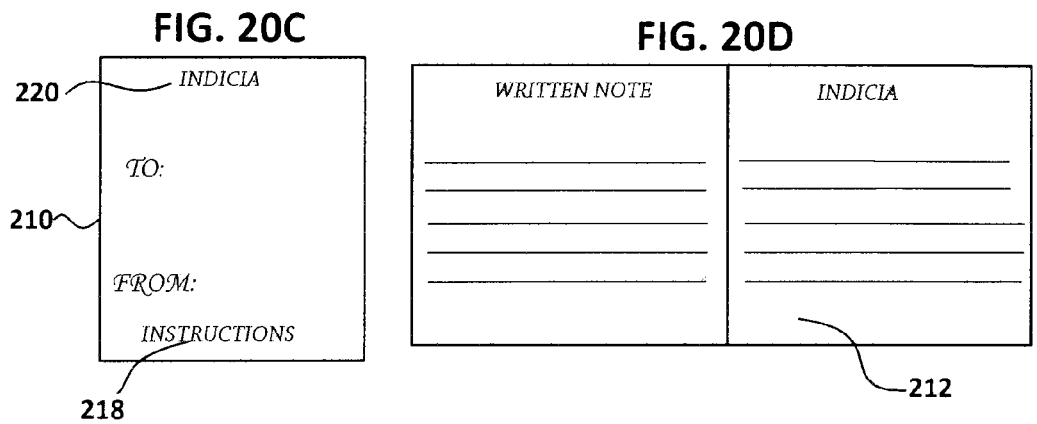
FIG. 20C
FIG. 20D
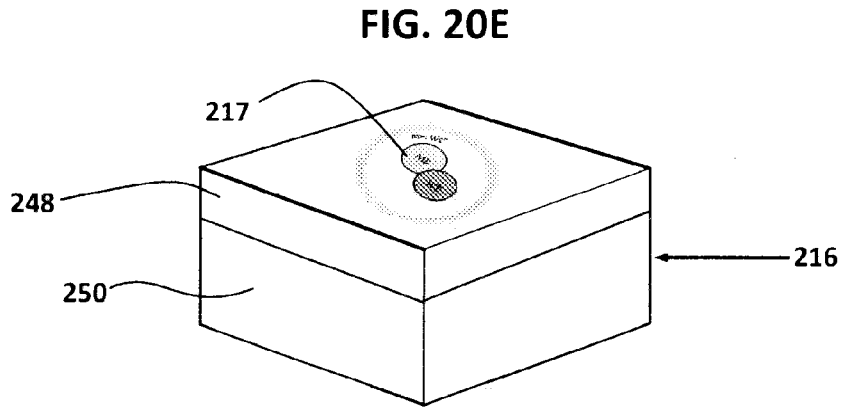
FIG. 20E

AMBIGRAM COIN AND KIT

BACKGROUND OF THE INVENTION

1. Field of the Invention

The present invention relates to coins, more particularly, an ambigram coin comprising a cut-out hollow legend which is an ambigram, a word having vertical rotational symmetry that reads as one word when an obverse side of the coin is displayed in one orientation and the ambigram reads as a different word when a reverse side of the coin is rotated 180 degrees around an x-axis. In addition, the invention relates to an ambigram coin kit including the elements including an ambigram coin, a displaying device, a printed gift card including indicia and instructions, a pre-composed message printed on note paper, a pocket, and a gift box, together combined in a gift box to give to a person who has lost a loved one as a palliative means to provide a token of consolation that animates love, comfort, companionship to the recipient of the ambigram coin who now knows that the giving party is present and nearby to provide companionship and comfort and the receiving person is not alone when going through his or her grief. In addition, the present invention has reference to jewelry including an ambigram coin including a principal legend cut-out including an ambigram which may be worn as a charm with a bracelet, bangle, necklace, earrings, watch, on a purse, or key chain, cufflinks, and baby pacifier.

2. Description of the Related Art

Coins are commonly used as numismatic products, commemorative tokens, and medallions including an ornamental design illustrating a particular mint, event, person, place, figure, logo, image, motive, that are formed of metals. The commemorative coins' design, mint mark, condition, and composition are usually collected by people marking a particular mint, event, sport, person, which remind the owner of a unique event and a glimpse into history and a better remembrance of the past.

Some people collect or give coins in the hope that they will appreciate in value. Some coins have intrinsic bullion value, such as silver, gold, and platinum coins. Other coins become valuable because they are rare. Coin collecting, one of the oldest hobbies, was once practiced only by kings and the wealthy. That's why coin collecting often is called the "king of hobbies" and the "hobby of kings."

Coin collecting or giving became increasingly popular in America during the 1930s when United States commemorative coins became widely available. Today, there are millions of coin collectors in the United States alone. The thriving coin-collecting community, which includes clubs throughout the United States, provides numerous opportunities for collectors to meet and trade.

Coins have commonly been used mounted as ornaments in the field of jewelry. Another typical feature in the field of jewelry is engraved or printed messages included on the exterior surface of the coin. It is popular to have identification engravings and personal messages typically engraved into wedding bands and bracelets for any number of personal reasons. In addition to, personal messages, engraved or printed messages can include generic statements such as, "friendship, love, forever," decorative designs, and other such inscriptions that may be mass produced for a larger range of people. Coins have been utilized as charms on necklaces, bracelets, earrings, tie, clasp, key chains, and purses. Jewelers have used coins to incorporate customized motives of an ornamental design illustrating a particular mint, event, person, place, figure, logo, image and therefore costly.

Therefore, coins are commonly used and have ornamental designs incused or as relief on the obverse and reverse sides of the coin that can be used as collector items or as jewelry.

Although, the coins are attractive and collectable either for oneself or as gifts to another person, there exists a need to produce a coin that incorporates the advantages of an ambigram legend cut-out, more particularly, "ME", which when vertically rotated at a measure of approximately 180 degrees by the user, reads "WE" which provides a palliative means to comfort and inspirit a person who receives the ambigram coin at a time of wrenching pain of sadness when the recipient has lost a loved one which cannot be unlived, or is facing daily challenges of a serious illness, which is what the present invention endeavors to overcome. In another aspect of the invention, the advantage of the ambigram coin is realized by providing an ambigram coin kit which comprises a coin having the legend cut-out "ME" or "WE" annunciating the person is not alone, a displaying device coupled to the ambigram coin, a pocket, a comforting message which can include a pre-written compassionate messages based in a variety of benevolences focused to loss of a loved one who may be an adult or child, or benevolences focused to a particular serious illness, and more particularly whether a transitory or terminal illness, a box. In another embodiment, the advantage of the ambigram coin is provided when the ambigram coin is or worn as a charm interchangeable with a bracelet, or necklace, earrings, tie clasp, key chain, pacifier, or ornament on a watch, purse, or luggage.

SUMMARY OF THE INVENTION

The present invention looks to introduce a new and novel invention into the field of coins that provides an ambigram coin. An ambigram is a word, art form or other symbolic representation, whose elements retain meaning when viewed or interpreted from a different direction, perspective, or orientation. The word of the ambigram may either change, or remain the same, when viewed or interpreted from different perspectives when rotated through a fixed angle. This is usually 180 degrees vertically rotated about an x-axis. By way of example, an ambigram is the word "MOM" which reads as "WOW" when rotated 180 degrees around an x-axis; or an ambigram is the lower-case abbreviation for "Down", dn, which looks like the lower-case word up when rotated 180 degrees around an x-axis.

The present invention looks to introduce a new and novel invention into the field of coins that provides an ambigram coin which has automatically operable means for rigidly retaining a through cut-out open legend bordered by internal side walls which circumscribe cut-out hollow letters of an ambigram which is used to animate a vertical rotational symmetrical word(s), preferably "ME" such that the ambigram coin vertically rotated about an x-axis 180 degrees reads as "WE" which annunciates a message of hope, inspiration, comfort, and companionship to a recipient person of the ambigram coin which makes the ambigram coin unique and novel.

Coins are commonly used and have ornamental designs incused or as relief on the obverse and reverse sides of the coin. Although, the coins are attractive and collectable either for oneself or as gifts to another person, they are lacking in an ambigram legend cut-out hollow design which provides a palliative means to comfort and inspirit a person who receives the ambigram coin at a time of wrenching pain of sadness when the recipient has lost a loved one which cannot be unlived, or when a person is facing daily challenges of a serious illness, whether transitory or terminal illness, or any life altering event which is what the present invention endeavors to overcome by providing an ambigram coin which includes the legend cut-out of "ME" a hollow ambigram design which when vertically rotated orientated 180 degrees about an x-axis displays the ambigram "WE" annunciating the person receiving the ambigram coin is not alone as they go through their time of grief, wrenching sadness and aloneness.

Through the decades where people have faced many of life's challenges together the ambigram coin provides a solid symbol of support to keep in a person's pocket. It is a reminder that the person is not alone in his or her difficulties, and now has someone in their life, who will be there for him or her.

To this endeavor, the invention provides a coin comprising an ambigram legend cut-out therethrough an obverse side of a field to a reverse side of the field forming a hollow ambigram including the letters "M" and "E" which reads "ME" when the coin is orientated at an obverse display position about an x-axis, such that the ambigram coin vertically rotated by a user to a measure of 180 degrees about the x-axis the letters "M" and "E" now reads "WE".

A displaying device can be passed through a hollow superior aperture disposed therethrough the ambigram coin to display the ambigram "ME" such that when the ambigram coin is vertically rotated 180 degrees about an x-axis the ambigram coin displays the ambigram "WE". In the alternative the displaying device is passed through an inferior aperture disposed therethough the ambigram coin to display the ambigram "WE" such that when the ambigram coin is vertically rotated 180 degrees about an x-axis the ambigram coin displays the word "ME".

According to what the invention endeavors to provide the advantage of the ambigram coin is realized in another aspect of the invention by providing an ambigram coin kit including, an ambigram coin, a displaying device, connecting device, a printed gift card including indicia and instructions, a pre-composed message printed on note paper, a pocket, and a gift box.

The ambigram coin having the cut-out hollow ambigram "ME" which when rotated a measure of approximately 180 degrees reads as "WE" annunciating the person is not alone.

In another embodiment, the advantage of the ambigram coin is provided when the ambigram coin is or worn as a charm interchangeable with a bracelet, or necklace, earrings, tie clasp, key chain, or purse, or held in a pocket with a comforting message, or worn as a charm interchangeable with a bracelet, or necklace, earrings, tie, clasp, key chain, pacifier, dog leash, or purse. The cut-out ambigram "ME" hollow ambigram design is formed preferably by a plasma cutter, or can be forced by stamping, casting or pressed out of a press-machine.

The inventor was inspired to invent the ambigram coin after she lost her close friend who was diagnosed with ALS and passed away six months later. The inventor saw a long felt need to inspirit others during a time of loss and grief or serious illness and invented the ambigram coin comprising a cut-out word "ME" such that when vertically symmetrically rotated a measure of 180 degrees about an x-axis tells the receiving party "WE". The recipient is then encouraged and enlivened and his or her pain is assuaged and well-being is re-established.

One object of the preferred embodiment of the present invention is to provide an ambigram coin of the above description that has a cut-out legend comprising a hollow ambigram design which is "ME" cut-out in a central portion of the field of the ambigram coin that when orientated at zero degrees about the x-axis displays the hollow ambigram "ME" and, subsequently, when the ambigram coin is rotated about the x-axis a measure of 180 degrees the hollow ambigram "WE" is displayed which when the ambigram coin is given to a person who had lost a loved one provides an inspiriting message that animates a message letting the recipient know that he or she is not alone during a time of loss or serious illness.

Another object of the preferred embodiment of the present invention is to provide an ambigram coin which has automatically operable means for rigidly retaining the legend ambigram cut-out "ME" and "WE" centrally disposed within the ambigram coin.

Another object of the present invention is to provide an ambigram coin that is of strong, study construction having a smooth exterior surface.

Another object of the present invention is to provide an ambigram coin that is aesthetically pleasing to a person.

Another object of the present invention is to provide an ambigram coin that is easily maintained in a pocket that is easily placed for easy access within a garment pocket of a person.

Another object of the present invention is to provide an ambigram coin kit including the elements including an ambigram coin, a displaying device, a printed gift card including indicia and instructions, a pre-composed message printed on note paper, a pocket, and a gift box.

Another object of the present invention is to provide an ambigram coin comprising the ambigram "ME" and "WE" cut-out of a central solid portion of the ambigram coin which has an aperture which has automatically operable means for maintaining the ambigram coin upon a necklace.

Another object of the present invention is to provide an ambigram coin comprising the hollow ambigram "ME" and "WE" cut-out of a central solid portion of the ambigram coin which, also, includes a superior and inferior aperture, to provide an opening through which a displaying device is passed through so that the ambigram coin can be worn as jewelry by a user.

Another object of the present invention is to provide an ambigram coin comprising the cut-out hollow ambigram "ME" so that the ambigram coin can be connected to a purse.

Another object of the present invention is to provide an ambigram coin comprising the cut-out hollow ambigram "ME" that is non-denominational.

Another object of the present invention is to provide an ambigram coin comprising the cut-out hollow ambigram "WE" that is non-denominational.

It is understood that ambigram coins, described throughout the application and described or shown in use with an ambigram coin kit, however, this is in no way intended to limit the scope of the present invention. Any similar application, containing an ambigram coin, having a legend cut-out therethrough, in use with any type of coin, kit, jewelry, containing the cut-out hollow ambigram "ME" and "WE" ambigram is within the contemplation of the present invention.

BRIEF DESCRIPTION

The following drawings are illustrative of particular embodiments of the invention and therefore do not limit the scope of the invention. The drawings are not to scale and are intended for use in conjunction with the explanations in the following detailed description. Embodiments of the invention will hereinafter be described in conjunction with the appended drawings, wherein like numerals denote like elements.

FIG. 3A is a perspective view of the ambigram coin of FIG. 1.

FIG. 3B is a perspective view of the ambigram coin of FIG. 2B.

FIG. 3C is a perspective side view of the ambigram coin of FIG. 3A.

FIG. 4A is a top planar view showing the obverse display position of another exemplary embodiment of the ambigram coin.

FIG. 4B is a top planar view of the ambigram coin of FIG. 4A showing the reverse display position.

FIG. 5A is a top planar view of yet another embodiment of the ambigram coin showing the obverse display position.

FIG. 5B is a top planar view of the ambigram coin of FIG. 5A showing the reverse display position.

FIG. 6A is a top planar view of yet another embodiment of the ambigram coin showing the obverse display position.

FIG. 6B is a top planar view of the ambigram coin of FIG. 6A showing the reverse display position.

FIG. 7A is an elevation front view of yet another embodiment of the ambigram coin in the obverse display position including a displaying device.

FIG. 7B is an elevation view of FIG. 7A in the obverse display position including a displaying device.

FIG. 9A is a perspective front view of another exemplary embodiment of the ambigram coin in the obverse display position displayed on a necklace.

FIG. 9B is a perspective view of the ambigram coin of FIG. 9A in the reverse display position, displayed on a necklace.

FIG. 11A is a top planar front view of another exemplary embodiment of the ambigram coin in the obverse display position showing a right aperture and a left aperture, connecting device and displaying device.

FIG. 11B is a top planar view of the ambigram coin of FIG. 11A showing the reverse display position.

FIG. 14 is a perspective view of another exemplary embodiment of the ambigram coin displayed on a watch.

FIG. 15A is a perspective view of another exemplary embodiment of the ambigram coin displayed on a first earring hoop.

FIG. 15B is a perspective view of another exemplary embodiment of the ambigram coin displayed on a second earring hoop.

FIG. 16 is a perspective view of another exemplary embodiment of the ambigram coin displayed on a cufflink.

FIG. 20A is a top planar view of an ambigram coin assembled with a displaying device, an element of an ambigram coin kit.

FIG. 20B is a perspective view of a pocket, another element of the ambigram coin kit, to retain the ambigram coin of FIG. 20A.

FIG. 20C is a top planar view of a printed gift card, another element of the ambigram coin kit.

FIG. 20D is a top planar view of a pre-composed message printed on a note paper, another element of the ambigram coin kit.

FIG. 20E is a perspective view of a gift box with a label, another element of the ambigram coin kit.

NUMERALS LIST

Figure 1:
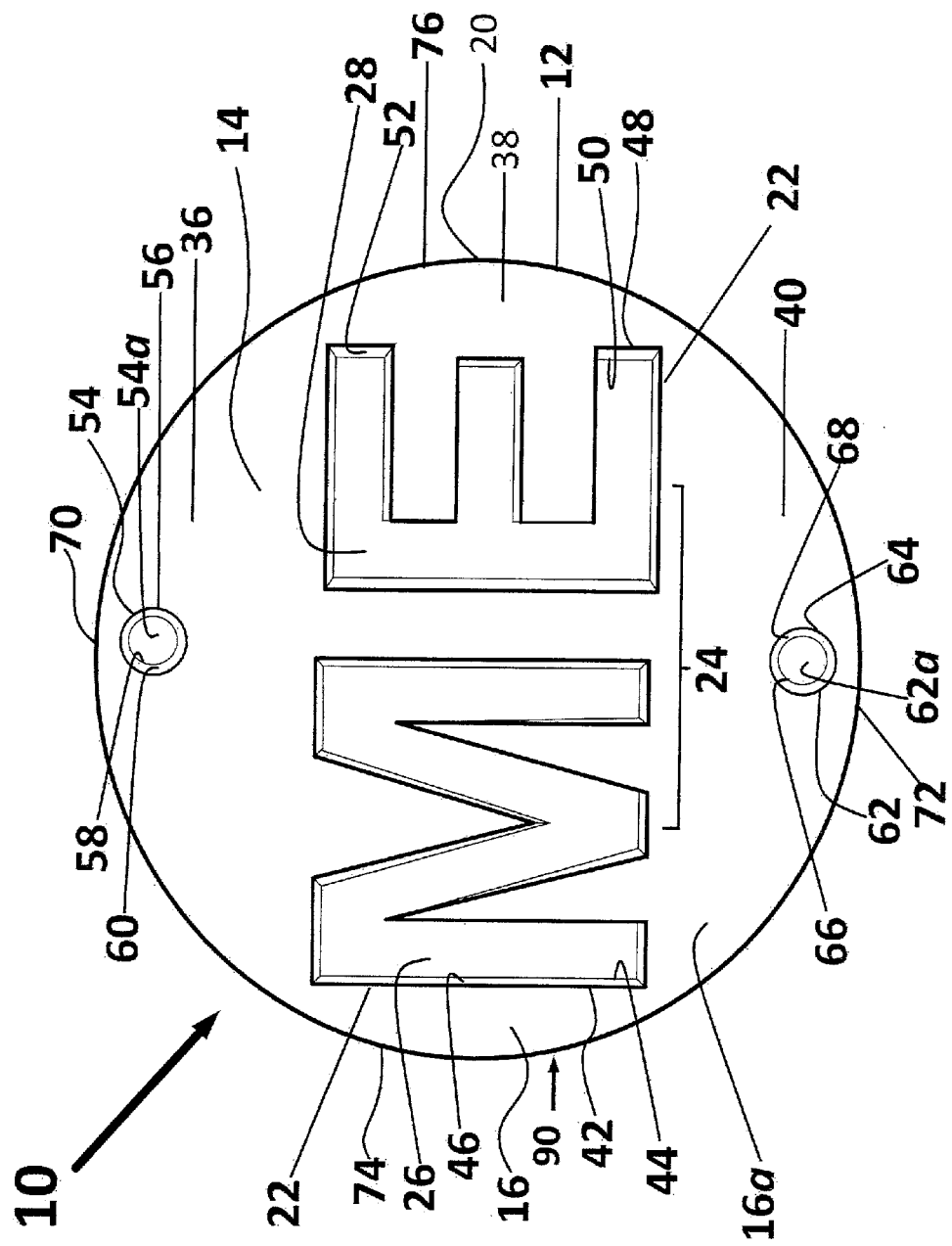
FIG. 1 is an elevation front view of an exemplary embodiment of an ambigram coin showing an obverse side displaying the cut-out hollow ambigram "ME".

10—ambigram coin
12—ambigram coin body
14—solid field
16—obverse side
16a—exterior surface of obverse side
18—reverse side
18a—exterior surface of reverse side
20—edge side
22—cut-out hollow ambigram legend
24—cut-out hollow ambigram "ME"
24a—cut out hollow ambigram "WE"
26—cut-out hollow letter "M"
26a—cut-out hollow letter "W"
28—cut-out hollow letter "E"
28a—cut-out hollow letter "E" reverse side
30—portion of a link chain necklace
$30^1$—first end of a portion of chain
$30^2$—second end of a portion of chain
32—obverse circumferential rim
34—reverse circumferential rim
36—superior portion of the field
38—central portion of the field
40—inferior portion of the field
42—obverse border of the cut-out hollow open letter "M"
44—reverse border of the cut-out hollow letter "M"
46—interior side walls of the cut-out hollow letter "M"
48—obverse border of the cut-out hollow letter "E"
50—reverse border of the cut-out hollow letter "E"
52—interior side walls of the cut-out open letter "E"
54—superior aperture
54a—superior aperture opening
56—obverse border of superior aperture
58—reverse border of superior aperture
60—interior side wall of superior aperture
62—inferior aperture
62a—inferior aperture opening
64—obverse border of inferior aperture
66—reverse border of inferior aperture
68—interior side wall of inferior aperture 70—top edge
72—bottom edge
74—right side edge of ambigram coin
76—left side edge of ambigram coin
78—displaying device
80—metallic ring connecting device
80¹—metallic ring connecting device
80²—metallic ring connecting device
82—suede cord
82a—first end of suede cord
82b—second end of suede cord
84—heart shape aperture
86—heart—shaped superior aperture
88—heart—shaped inferior aperture
90—obverse display position
92—reverse display position
94—right aperture
94a—right aperture opening
96—left aperture
96a—left aperture opening
98—loop portion of first eye bolt
100—loop portion of second eye bolt
102—left rotatable connector pin device
104—right rotatable connector pin device
106—first pin receptacle
106a—distal end of right rotatable connector pin
106b—proximal end of first pin receptacle
108—second pin receptacle
108a—distal end of left rotatable pin
108b—proximal end of second pin receptacle
110—first eye bolt
112—second eye bolt
114—necklace
116—key ring
118—first chain bracelet
119¹—first metallic ring on first chain bracelet
119²—second metallic ring on second chain bracelet
120—second chain bracelet
122—bangle bracelet
124—watch
126—metallic rings on watch
128¹—first earring hoop
128²—second earring hoop
130¹—metallic ring on first earring hoop
130²—metallic ring on second earring hoop
132—cufflink
134—metallic rings on cufflink
136—dog collar
138—metallic ring on dog collar
140—ribbon baby pacifier
142—metallic ring on baby pacifier
144—first receptacle of first pin body
146—second pin receptacle
148—interior female threads of first receptacle
150—interior female threads of second receptacle
152—first male threaded shank of first eye bolt
154—second male threaded shank of second eye bolt
156—purse
158—metallic ring on purse
200—ambigram coin kit
210—pre-printed gift card
212—printed message note paper
214—pocket
216—gift box
217—label
218—instructions
220—indicia
222—lining of pocket
224—magnetic snap
226—male portion metallic snap
226¹—female portion fastening means—metallic snap
228—top opening of pocket
230—bottom on pocket
232—apex of pocket
234—front top edge of pocket
236—rear top edge of pocket
238—left side of pocket
240—right side of pocket
242—peripheral marginal seam
244—bottom diagonal right side
246—bottom diagonal left side
248—lid of box
250—container bottom of box
252—front panel of pocket
254—rear panel of pocket
256—label on box with indicia
258—front panel lining
260—rear panel lining

DETAILED DESCRIPTION

For the purpose of promoting an understanding of the principles of the invention, reference will now be made to the embodiments illustrated in the drawings and specific language will be used to describe the same. It will, nevertheless, be understood that no limitation of the scope of the invention is thereby intended; any alterations and further modification of the described or illustrated embodiments, and any further applications of the principals of the invention as illustrated therein, are contemplated as would normally occur to one skilled in the art to which the invention relates.

Figure 2A:
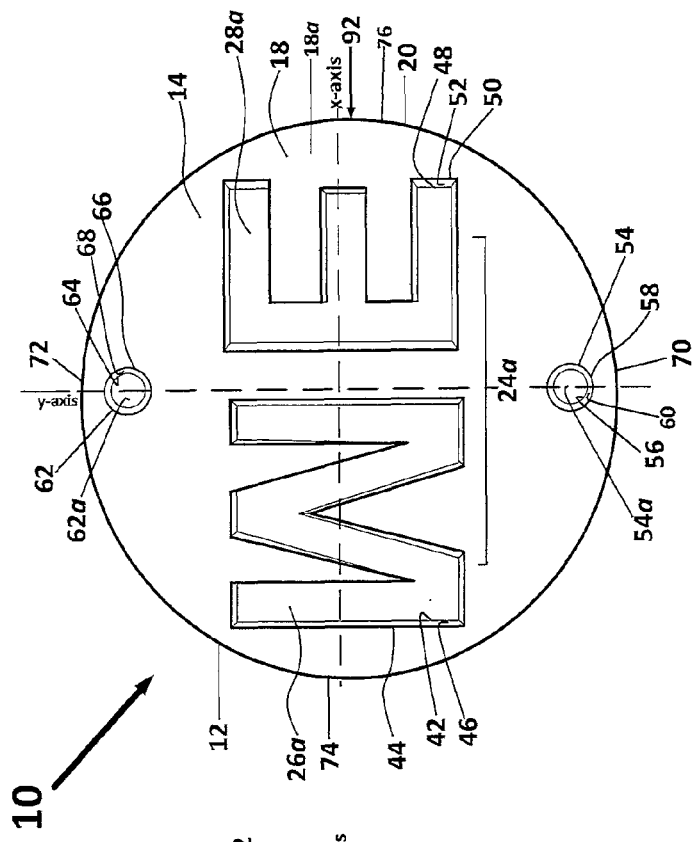
FIG. 2A is an elevation front view of the ambigram coin of FIG. 1 showing the obverse display position about an x-axis and a y-axis.

Referring now to the drawings featuring the salient features of the invention there is illustrated in FIG. 1-FIG. 2A an ambigram coin, a top planar front view of an ambigram coin 10 which has an automatically operable means for rigidly retaining a through cut-out open ambigram legend 22, more particularly the cut-out ambigram "ME" 24 having hollow letters "M" 26 and "E" 28. FIG. 1B shows a top planar view of the ambigram coin 10 of FIG. 2A vertically rotated symmetrically a measure of approximately 180 degrees whereby the cut-out open ambigram "ME" 24 by the inherent nature of an ambigram which is unique feature of the invention, is now displayed as the ambigram legend "WE" 24a such that the cut-out hollow letters "M" 26 and "E" 28 are now displayed as the cut-out hollow letters "W" 26a and "E" 28a.

The ambigram coin 10 is provided which has automatically operable means for rigidly retaining a cut-out open ambigram legend 22 comprising the cut-out open ambigram "ME" 24 whereby when vertically rotated a measure of approximately 180 degrees the cut-out open ambigram "ME" 24 is now displayed as the cut-out open ambigram "WE" 24a as a message of hope, inspiration, comfort, and companionship from a gifting person to a recipient person of the ambigram coin 10 which makes the ambigram coin 10 unique and novel.

An ambigram is a word, art form or other symbolic representation, whose elements retain meaning when viewed or interpreted from a different direction, perspective, or orientation. The word of the ambigram may either change, or remain the same, when viewed or interpreted from different perspectives when rotated through a fixed angle. This is usually 180 degrees vertically rotated about an x-axis. By way of example, an ambigram is the word "MOM" which reads as "WOW" when rotated 180 degrees around an x-axis; or an ambigram is the lower-case abbreviation for "Down", dn, which looks like the lower-case word up when rotated 180 degrees around an x-axis.

Figure 2B:
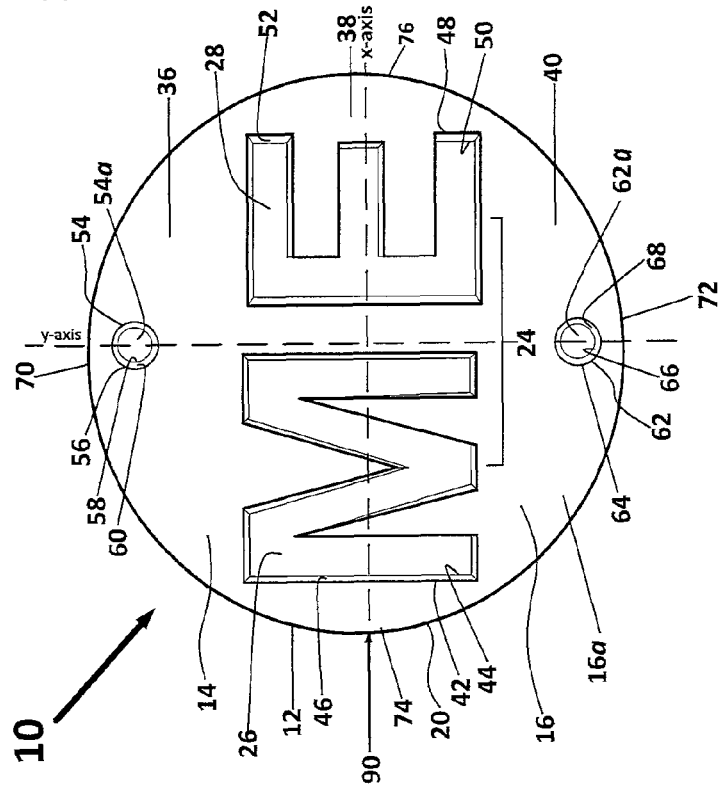
FIG. 2B is an elevation rear view of the ambigram coin showing a reverse display position a reverse side displaying the cut-out hollow ambigram "WE".

In a more detailed description, as illustrated in FIGS. 1 and 2A a perspective top planar front view of the ambigram coin 10, and FIG. 2B a perspective top planar view of the ambigram coin 10 of FIG. 2A vertically rotated a measure of approximately 180 degrees about an x-axis (illustrated by phantom dotted line), the ambigram coin 10 comprises a coin body 12 comprising a solid field 14 which is a flat portion of the ambigram coin 10 substantially in the shape of a circle. The field 14 includes a superior portion 36, an inferior portion 40, and a central portion 38 therebetween, the central portion 38 including the cut-out hollow ambigram legend 22 therethrough.

The field 14 is limited by three sides; an obverse side 16, a reverse side 18, and an edge side 20. The obverse side 16 and the reverse side 18 each has a radius $r^1$, diameter $D^1$, and circumference $C^1$ that are identical in size and shape, the medial x-axis, illustrated by phantom dotted line x-axis and a medial y-axis, illustrated by phantom dotted line y-axis; and a third side, the edge side 20 which is the outer border of the ambigram coin 10, as illustrated in FIGS. 3A and 3B in a perspective view of the ambigram coin 10.

Figure 8A:
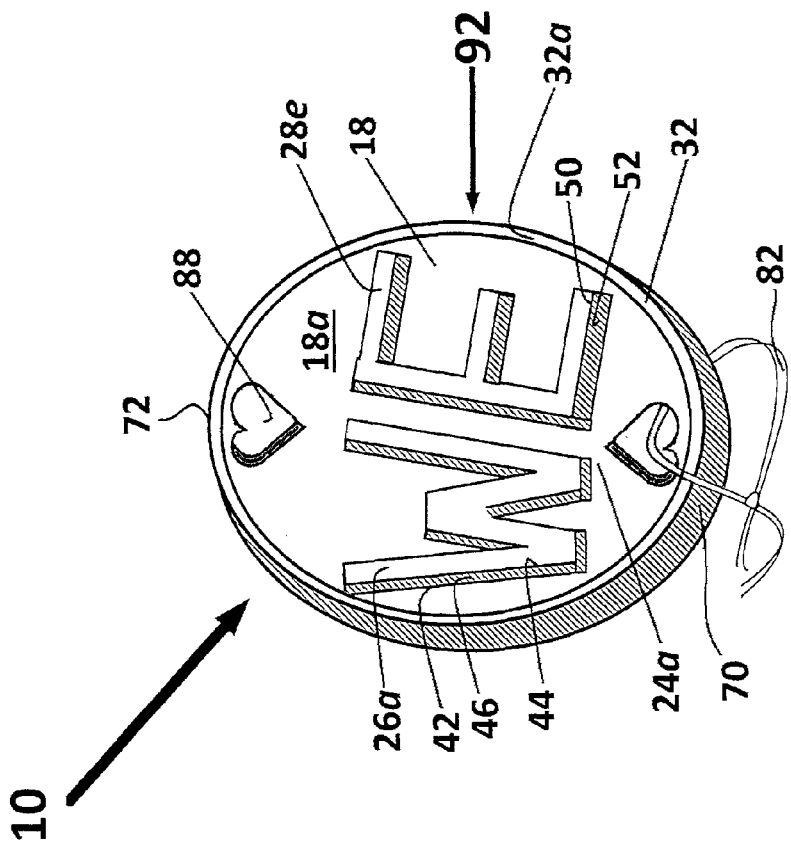
FIG. 8A is a perspective front view of yet another embodiment of the ambigram coin in the obverse display position.
Figure 8B:
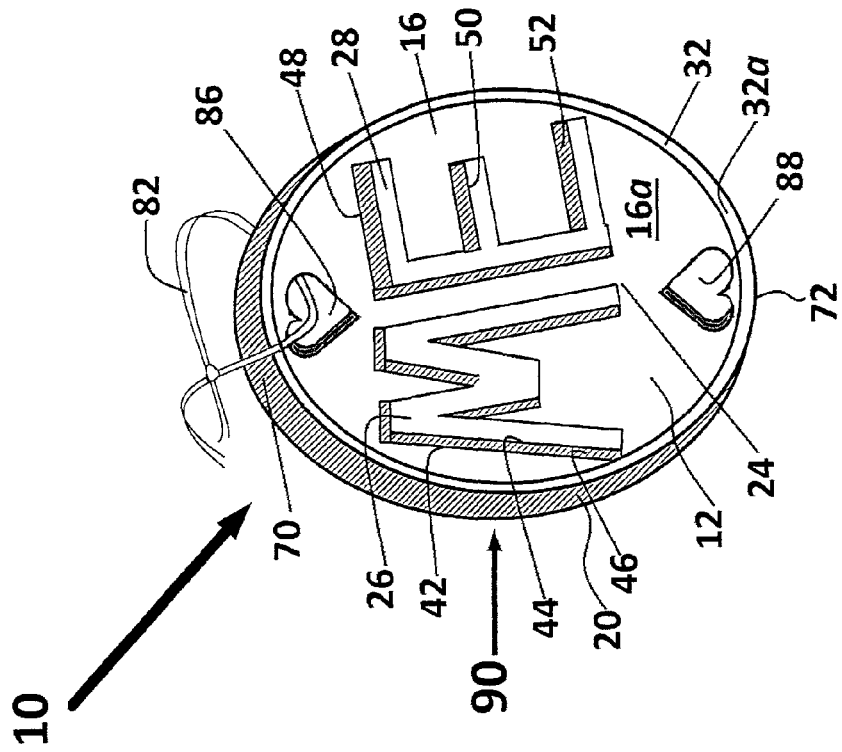
FIG. 8B is a perspective view of FIG. 8A in the reverse display position.

The edge side 20 can be plain, reeded, lettered, or decorated. In a preferred embodiment, as shown in FIGS. 3A and 3B the edge side 20 is plain. In another exemplary embodiment, the edge side 20 can be reeded, as depicted in FIGS. 8A and 8B. The edge side 20 has a thickness of a measure of width $T^1$ and the diameter $D^1$, as shown in FIG. 3C, a planar side view of the ambigram coin 10.

Referring in more detail to FIGS. 1, 2A, 2B, 3A and 3B, the cut-out open ambigram legend 22 includes the cut-out hollow letters "M" 24 and "E" 26 horizontally ordered right to left in the central portion 38 of the field 14 along the medial x-axis when the ambigram coin 10 is displayed in an obverse display position 90. The cut-out hollow letters "M" 26 and "E" 28 are sized to fit in its entirety within the field 12 of the coin body 12 without extending beyond the edge side 20 of the ambigram coin body 12.

Each letter, "M" 26 and "E" 28 of the ambigram legend 22 is hollow formed by the cutting out of the shape of the letter "M" 26 and the shape of the letter "E" 28 from the solid central portion of the field 14 by using a plasma cutter, the method of which is described in more detail below. Thereby, each cut-out open letter, "M" 26 and "E" 28 is cut therethrough from an obverse exterior surface 16a to a reverse exterior surface 18a of the field 14 of ambigram coin 10 to form the hollow letters "M" 26 and "E" 28 which displays the hollow ambigram "ME" 24 when displayed in the obverse display position 90 and displays the ambigram "WE" 24a including the hollow letters "W" 24a and "E" 28a when vertically rotated approximately 180 degrees about the x-axis to a reverse display position 92.

In use, the ambigram coin 10 including the cut-out legend 22 comprising of the ambigram "ME" 24 in the obverse display position 90 and comprising of the ambigram "WE" 24a in the reverse display position is critical to the use of the ambigram coin 10 according to the preferred embodiment of the present invention, because the ambigram "ME" 24 and "WE" 24a provide palliative treatment which animates a message of compassion and companionship from a giving party to a receiving party which inspirits the receiving party to know the ambigram coin 10 delivers companionship, and the recipient is enlivened and encouraged that he or she is not alone when going through a wrenching sadness in his or her life, especially upon the loss of a loved person in his or her life which cannot be unlived or when a person is facing the daily challenges of a serious illness, whether transient or terminal illness. The recipient of the ambigram coin 10 now knows that the giving party is present and nearby to provide companionship and comfort and the receiving person is not alone when going through his or her grief. The ambigram coin 10 is a palliative means to assuage the recipient party's emotional pain from grief, depth of sadness, despondency, hopelessness, and feelings of being alone as a consequence of a loss or when a person is facing the daily challenges of a serious illness, whether the illness is transient or a terminal illness.

As shown in FIGS. 1-8B, because the cut-out hollow ambigram "ME" 24 is cut-out of the central portion 38 of the field 14 from the exterior surface 16a of the obverse side 16 therethrough to the exterior surface 18a of the reverse side 18 of the ambigram coin body 12 the cut-out open ambigram 24 is read as the ambigram "ME" 24 when the ambigram coin 10 is orientated in the obverse display position 90, and the cut-out ambigram 22 is read as a second ambigram "WE" 24a when the ambigram coin 10 is vertically rotated a measure of approximately 180 degrees about the x-axis to the reverse display position 92, the expense of making a second coin including a second word is obliterated.

As illustrated in FIGS. 2A-6 one ambigram coin 10 animates two words to a user, or to a person receiving the ambigram as a gift. the ambigram"ME" 24 and when rotated approximately 180 degrees about the x-axis is displayed as the ambigram "WE" 24a cut out of one ambigram coin 10 further annunciating the message to the recipient party, that he or she is not alone such that "ME" 24 is consubstantial with "WE" 24a.

As illustrated in FIGS. 2A, 2B and 3A and 3B, the formed cut-out hollow letter "M" 26 has an obverse border 42 and a reverse border 44 to interior side walls 46 which circumscribes the opening of the letter "M" 26. The cut-out open letter "E" 28 includes an obverse border 48 and a reverse border 50 to internal side walls 52 which circumscribes the opening of the cut-out open letter "E" 28 therethrough. Each of the side walls 46 and 52 of each cut-out hollow letter "M" 26 and cut-out hollow letter "E" 28, respectively, has a thickness $T^2$ measure that is equal to the thickness $T^1$ measure of the edge side 20 of the field 14 of the ambigram coin 10 so that the obverse border 42 of the cut-out hollow letter "M" 26 and the obverse border 48 of the hollow letter "E" 28 are flush with the obverse exterior surface 16a of the solid field 14 of the ambigram coin 10. Accordingly, the reverse border 44 of the cut-out hollow letter "M" 26 and the reverse border 50 of the cut-out open letter "E" 28 are flush with the posterior exterior surface 18a of the solid field 14 of the ambigram coin 10.

As illustrated in FIGS. 3A and 3B the hollow letter "M" 26 includes the obverse border 42 which is equal in measurement of height and width to the reverse border 44 of the hollow letter "M" 26 so that the interior side walls 46 of the hollow letter "M" 26 has a thickness $T^2$ that is equal to the thickness $T^1$ of the edge side 20 of the ambigram coin body 12 so that the hollow letter "M" 26 is clearly displayed in the obverse position 90 and the hollow letter "W" 26a is clearly displayed in the reverse display position 92. And similarly, the hollow letter "E" 28 includes the obverse border 48 which is equal in measurement of height and width to the reverse border 50 of the hollow letter "E" 28 so that the interior side walls 52 of the letter "E" has a thickness $T^2$ that is equal in thickness $T^1$ of the edge side 20 of the ambigram coin body 12, so that the so that the hollow letter "E" 28 is clearly displayed in the obverse position 90 and the hollow letter "E" 28a is clearly displayed in the reverse display position 92.

It is critical that the obverse border 42 and the reverse border 44 of the cut-out hollow letter "M" 26; and the obverse border 48 and the reverse border 50 of the cut-out hollow letter "E" 28 are equal so that the integrity of the cut-out hollow ambigram legend "ME" 24 is maintained whereby the cut-out hollow ambigram legend "ME" 24 is clearly displayed therethrough from the obverse exterior surface 16a to the reverse exterior surface 18a as the cut-out hollow ambigram "ME" 24 in a first obverse display position 90, and, subsequently, when the ambigram coin 10 is rotated a measure of approximately 180 degrees about the median x-axis, the cut-out hollow ambigram legend "WE" 24a is clearly displayed therethrough from the reverse exterior surface 18a to the obverse exterior surface 16a of the of the ambigram coin 10.

Referring to FIGS. 4A-6B the cut-out hollow letters "M" 26 and "E" 28 can be cut-out in a form selected from a variety of fonts. Standard fonts are available through the software and also may be imported from other sources into the software.

While each ambigram coin 10 is similar in thickness of approximately $T^1$, circumference $C^1$ and diameter $D^1$, the font of the specific ambigram legend 22 may be different, as shown in FIGS. 1-6B. During the process of manufacture, as described in detail below, the standard fonts are available through software and also may be imported from other sources into the software. The fonts of the cut-out hollow letters "M" 24 and "E" 28 to form the cut-out hollow ambigram "ME" 24 are preferably sized to fit in their entirety within the central portion 38 of the field 14 of the ambigram coin body 12 without extending beyond the edge side 20 of the coin body 12. Consequentially, when the ambigram coin 10 is vertically rotated a measure of approximately 180 degrees about the x-axis the fonts of the hollow letters "W" 24a and "E" 28a to form the cut-out hollow ambigram "WE" 24a fit in their entirety within the central portion of the field 14 of the ambigram coin body 12 without extending beyond the edge side 20 of the ambigram coin body 12.

Therefore, only specific fonts that provide the required letter formation that will correctly and aesthetically display the cut-out hollow ambigram legend 22 in both the cut-out hollow ambigram "ME" 24 and when the ambigram coin 10 is vertically rotated a measure of approximately 180 degrees the cut-out hollow ambigram "WE" 24a are selected as base fonts.

During the manufacturing process of the ambigram coins 10, as described in more detail below, these base fonts are then modified through the application and programming of the computer software to create the appropriate dimension, curvature and spread of the cut-out hollow letters "M" 26 and "E" 28 for each ambigram coin 10 to be cut-out of the sheet metal. These computer files are then saved and reused for future cutting. Through the appropriate creation and setup of each computer file, the plasma cutter can be programmed to cut multiple ambigram coins 10 with multiple fonts at the same time.

In a preferred embodiment, as shown in FIGS. 1-6B the ambigram coin 10 is rimless. In the exemplary embodiment, the ambigram coin 10 is rimless so that when the user holds the ambigram coin 10 in his or her hand the exterior surface of the obverse side 16a is smooth and the exterior side of the reverse side 18a is smooth, and thereby the exterior surfaces 16a and 18a provides a soothing surface to hold on therewith the palm of his or her hand which provides a healing aspect consistent with the endeavor of the present invention.

In another embodiment of the present invention, as illustrated in FIGS. 8A and 8B the ambigram coin 10 includes a circumferential obverse rim 32 which is a raised edge set upward from the obverse exterior surface 16a, and a circumferential reverse rim 34 which is a raised edge set upward from the reverse exterior surface 18a of the ambigram coin 10 created by upsetting the mill using an upsetting machine.

As detailed in FIGS. 1-7 B and 9, 10A-10B, 11-19A the ambigram coin 10 is preferably constructed in circular fashion because the shape of a circle commonly represent unity, wholeness, and infinity without beginning or end which conveys that which the invention endeavors to provide through the ambigram "ME" 24 and "WE" 24a ambigram coin 10 when a person gives the ambigram coin 10 to another person. It is understood that the ambigram coin 10 may be similarly constructed with an ambigram coin 10 in a variety of shapes, for example, an oval, square, triangle, trapezoid, rectangle, octagon, pentagon, heart, and the like, which is also within the contemplation of the present invention. FIGS. 8A and 8B shows the ambigram coin 10 in the shape of an oval having the cut-out ambigram "ME" 24 centrally located therethough the field 14 of the ambigram coin body 12 which has a solid field 14 with automatically operable means for rigidly retaining a cut-out legend of an ambigram 22 which is used to display a vertical rotational symmetrical cut-out hollow ambigram "ME" 24 in the obverse display position 90, as shown in FIG. 8A, and when vertically rotated approximately 180 degrees about the x-axis to the reverse display position 92 displays the cut-out hollow ambigram "WE" 24a.

As such, any shape coin body 12 for the ambigram coin 10 may be used provided it may properly vertically rotate approximately 180 degrees about an x-axis so that the cut-out open ambigram legend 22 is displayed as cut-out open ambigram "ME" 24 at the obverse display position 90, and subsequently the cut-out open ambigram "WE" 24a is displayed as a user vertically rotates the ambigram coin 10 at a measure of approximately 180 degrees about the x-axis to the reverse display position 92.

In addition, it is important the metal used to manufacture, as explained in more detail below, the ambigram coin 10, in the preferred embodiment, has a relatively heavy weight because when the ambigram coin 10 is placed into a pocket or a recipient or user, the ambigram coin 10 provides weight which can be felt by the user in his pocket as a reminder of the support and companionship of the person who gave him or her the ambigram coin 10 including the heartfelt cut-out ambigram "ME" 24 and when rotated approximately 180 degrees is displayed as "WE" 24a inspiriting the recipient of the ambigram coin 10 that he or she is not alone.

Referring to FIGS. 1-3B, 8A-8B, 10A-10B, 12A-12B, 13, 14, and 18 the ambigram coin 10 further includes two apertures, a superior aperture 54 and an inferior aperture 62 which are each identical in size and shape cut-out open portions generally in the shape of a geometric shape, design, or ambigram legend 22. As illustrated in FIGS. 1-3B, 8A-8B, 10A-10B, 12A-12B, 13, 14, and 18 the superior aperture 52 circumvents a circular opening 54a; and the inferior aperture 62 circumvents an identical circular opening 62a. The superior aperture 54 is preferably disposed adjacent to a top edge 70 of the coin body 12 and transversally aligned along the medial y-axis a distance from the inferior aperture 62 which is disposed adjacent to an opposing bottom edge 72 of the coin body 12.

The superior aperture 54 comprises a through cut-out opening 54a bordered by an interior side wall 60 which circumscribes the opening 54a of the cut-out superior aperture 54. The cut-out open superior aperture 54 has an obverse border 56 and a reverse border 58 to the interior side wall 60 which circumscribes the opening 54a of the superior aperture 54.

The inferior aperture 62 comprises a through cut-out opening 62a bordered by an interior side wall 68 which circumscribes the opening 62a of the cut-out open inferior aperture 62. The cut-out open inferior aperture 62 has an obverse border 64 and a reverse border 66 to the interior side wall 68 which circumscribes the opening of the inferior aperture 60.

The superior aperture opening 54a has a diameter $D^1$ that is equal to the diameter $D^2$ of the inferior aperture opening 62a which contributes to the symmetry and aesthetic appearance of the ambigram coin.

The interior side walls 60 and 68 of each cut-out open superior aperture 54 and cut-out open inferior aperture 62, respectively, has a thickness $T^3$ measure that is equal to the thickness $T^1$ measure of the edge side 20 of the field 14 of the ambigram coin body 12 so that the obverse border 56 of the cut-out open superior aperture 54 and the obverse border 64 of the cut-out open inferior aperture 62 are flush with the obverse exterior surface 16a of the solid field 12 of the ambigram coin body 12, and accordingly, the reverse border 58 of the cut-out open superior aperture 54 and the reverse border 66 of the cut-out open inferior aperture 62 are flush with the reverse exterior surface 18a of the solid field 12 of the ambigram coin body 12.

The superior aperture 54 and the inferior aperture 62 are dimensioned smaller in size than the larger ambigram legend "ME" 24 and therefore does not deter the user or viewer's attention away from the cut-out hollow ambigram "ME" 24 and thereby does not deter from its message.

In a preferred embodiment, as shown in FIGS. 4A-9B, 15, 17 and 20A the superior aperture 54 is generally in the shape of a heart 115 disposed adjacent to the top edge 70 of the ambigram coin body 12; and the inferior aperture 62 is generally in the shape of an identical heart 115 disposed a short distance from a bottom edge 72 of the ambigram coin body 12. The shape of the heart 115 provides an aesthetic of love, care, empathy, compassion, understanding, joyfulness, which is consubstantiates with the principal legend ambigram "Me" 24 and when the ambigram coin 10 is vertically rotated a measure of 180 degrees "We" 24a which animates a message of companionship from the ambigram coin 10.

Thereby, the superior aperture 54 and inferior aperture 62 provides an aesthetic aperture to allow a displaying device 78 to be passed therethrough at least one of the apertures 54 and 62 thus permitting the ambigram coin 10 to be coupled to a displaying device 78.

In the exemplary embodiment, as shown in FIGS. 7A-7B, 8-10B, and 20A, the cut-out open superior aperture 54 and the cut-out open inferior aperture 62 each is dimensioned to receive a displaying device 78. The displaying device 78 can be selected from the group comprising a suede cord 82, a bangle bracelet 122, a chain bracelet 130, a necklace 114, a key ring 116, a pair of earring hoops, a first earring hoop $128^1$, and a second earring hoop $128^2$, a watch 124, cufflinks 132, a dog collar 136, a ribbon baby pacifier 140, purse 156, or any displaying device which generally relates to the field of jewelry.

As shown in FIGS. 7A-7B, 8-10A, and 20A, the displaying device 78 is passed through the opening 54a superior aperture 54 whereby the ambigram coin 10 is displayed in the obverse display position 90 so that the obverse side 16 of the ambigram coin 10 is revealed which displays the cut-out open ambigram "ME" 24 to a user, and subsequently when the ambigram coin 10 is vertically rotated a measure to approximately 180 degrees to the reverse display position 92 the reverse side 18 of the ambigram coin 10 is revealed which displays the cut-out open ambigram "WE" 24a to a user.

Figure 10A:
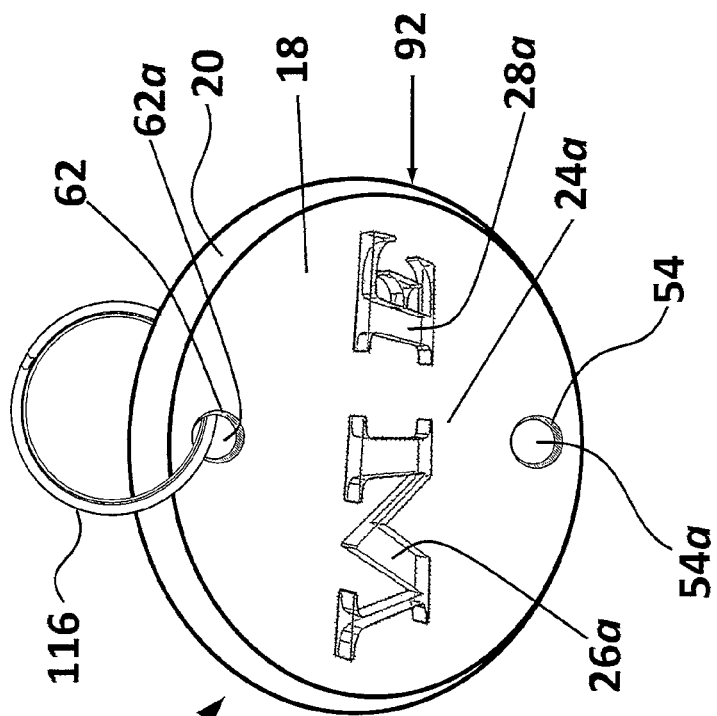
FIG. 10A is a perspective front view of another exemplary embodiment of the ambigram coin displayed on a key chain coupled therewith a superior aperture.
Figure 10B:
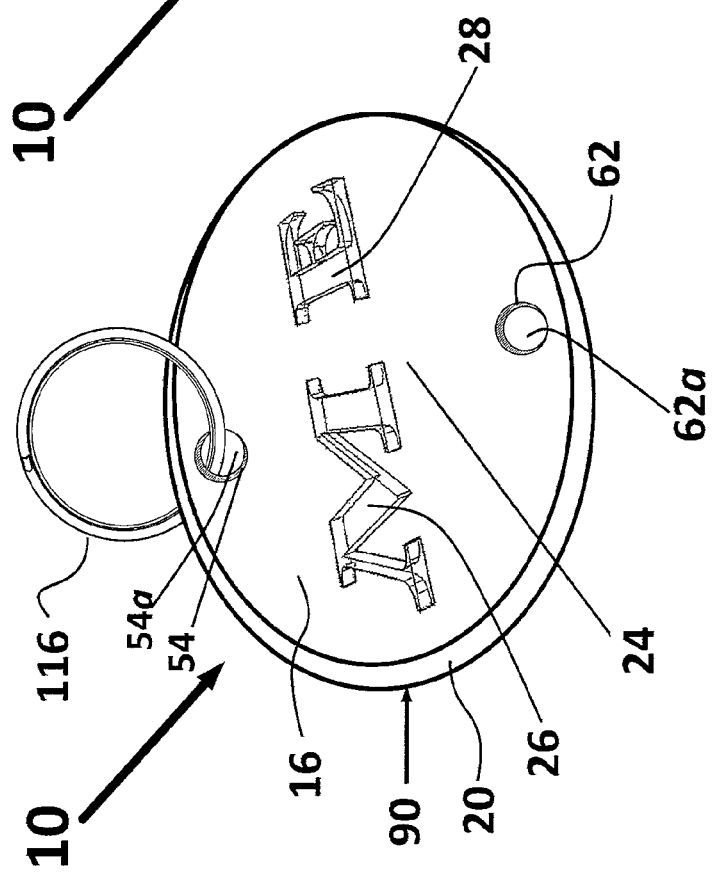
FIG. 10B is a perspective view of another exemplary embodiment of the ambigram coin in the reverse display position displayed on a key chain coupled therewith an inferior aperture.

In the alternative, as shown in FIG. 10B the displaying device 78 is passed through inferior aperture such that the ambigram coin 10 is orientated in the reverse display position 92 such that the cut-out hollow ambigram 10 "WE" 24a is displayed.

As shown in FIGS. 7A-7B and FIGS. 8A and 8B, the disposition of the superior aperture 54 to the disposition of the inferior aperture 62 wherein the superior aperture 54 is located a distance from the inferior aperture 62 along the medial y-axis of the ambigram coin 10, and wherein the cut-out open ambigram "ME" 24 is centrally located, is critical, so that the ambigram coin 10 can be orientated by the user for use or wear in two vertical display positions, an obverse display position 90 and a reverse obverse display position 92, whereby when the ambigram coin 10 is in the obverse display position 92 the cut-out open ambigram "ME" 24 is display, and, subsequently, when the ambigram coin 10 is rotated a measure of approximately 180 degrees about the medial x-axis the ambigram coin 10 is in the reverse display position the cut-out open ambigram "WE" 24a is displayed.

Thereby, either any one of the superior aperture 54 or the inferior aperture 62 each provides an opening 54a, or 62a, respectfully, through which a displaying device 78 may be passed therethrough from the obverse 16 side of the ambigram coin 10 to the reverse side 18 of the ambigram coin 10. In a preferred embodiment, the displaying device 78 is a suede cord 82, which is passed through either one of the superior aperture 54, as shown in FIGS. 7A and 7 B, and FIG. 10A, or the inferior aperture, as illustrated in FIG. 10B, and tied in a knot to secure the suede cord 82 in a loop extending from the ambigram coin 10 and thereby the suede cord 82 loop coupled thereto.

More particularly, as shown in FIGS. 7A and 7B the ambigram coin 10 when orientated in the obverse position 90, a first end 82a of the suede cord 82 is passed therethrough the superior aperture 54 and tied to a second end 82b of the suede cord 82 to form a loop extending from the superior aperture 54 of the ambigram coin 10. The ambigram coin 10 now suspended on the suede cord 82 loop connected to the superior aperture 54 can be orientated in the obverse position 90 such that the obverse side 16 is in view to a user and maintained at a measure of approximately 90 degrees about the medial x-axis so that the cut-out open ambigram "ME" 24 is displayed, and, subsequently, when the ambigram coin 10 is rotated to the measure of 180 degrees about the medial x-axis the reverse side 18 is now revealed to a user so that the cut-out open ambigram "WE" 24a is displayed.

FIGS. 7A and 7B depicts a preferred embodiment of the invention which is more closely adapted for use with another aspect of the invention, an ambigram coin kit 200, as described in more detail below. The displaying device 78 preferably formed of easily foldable suede cord 82 is passed through a heart shaped superior aperture 86. The suede cord 82, also, provides a displaying device 78 for a user to grab on to and thereby easily retrieve the ambigram coin 10 when placed in a pocket 214 of the user.

Referring to FIGS. 8A and 8B, the obverse rim 32 and the reverse rim 34 are circumferentially disposed adjacent to the edge side 20 and each obverse rim 32 and reverse rim 34 is raised a short distance from the obverse exterior surface 16a and the reverse exterior surface 18a, respectfully. Each of the obverse rim 32 and reverse rim 34 is identical in size and shape and each of the obverse rim 32 and the reverse rim 34 has an upper circumference $C^1$ equal to the circumference $C^1$ of the edge side 18 and a lower circumference $C^2$ which is less than the upper circumference $C^1$.

The obverse rim 32 and the reverse rim 34 provide protection against wear to the ambigram coin's 10 cut-out open ambigram legend 22 whereby the obverse rim 32 and the reverse rim 34 provide a raised inside border on the obverse side 16 and the reverse side 18, respectfully. Each of the circumferential rims 32 and 34 can include any one of a smooth border, double border, ripped border, deviced border, corner border, wave border, or spiral border. (Not shown)

The obverse rim 32 and the reverse rim 34 each provide a decorative aesthetic to the ambigram coin 10 and, further, each of the rims 32 and 34 provides a means whereby a message, design, logo, or script, authored by the giving person to a specific recipient person, can be engraved upon an exterior surface 32a of the obverse rim 32, or the exterior surface 34a of the reverse rim 32a of the ambigram coin 10.

FIGS. 9A and 9B depicts another embodiment of the invention, showing the displaying device is a necklace 114. This exemplary embodiment displays the ambigram coin 10 such that the necklace 114 is passed through the superior aperture 54 of the ambigram coin 10 with the cut-out hollow ambigram "ME" 24 centrally disposed. Thereby the necklace 114 is coupled thereto the superior aperture 54 as a means to display the ambigram coin 10 for the user to wear as a piece of jewelry around his or her neck in the obverse display position 90 for displaying the cut-out hollow ambigram "ME" 24. As such, the ambigram coin 10 can easily be vertically rotated to display the ambigram "WE" as shown in FIG. 9B, reminding the wearer he or she is not alone.

In yet another embodiment of the present invention, the displaying device 78 is a key ring 116, as shown in FIGS. 10A and 10B which illustrates two features of the ambigram coin 10: (1) the adaptability of the ambigram coin 10 to a variety of displaying devices 78; and (2) the displaying device 78 the key ring 116, can be passed through the superior aperture 54 having the ambigram coin 10 oriented in the obverse display position 90 to display the ambigram "ME" 24, or the displaying device 78, the key ring 116 can be passed through the inferior aperture 62 having the ambigram coin orientated in the reverse display position 92 to display the ambigram "WE" 24a.

The ambigram coin 10 now suspended on the key ring 116 coupled to the inferior aperture 62 can be orientated in the reverse display position 92 such that the reverse side 18 is in view to a user so that the cut-out hollow ambigram "WE" 24a is displayed, and, subsequently, when the ambigram coin 10 is rotated to the measure of 180 degrees about the medial x-axis the obverse display position 90 such that the obverse side 16 is now revealed to a user so that the cut-out open ambigram "ME" 24 is displayed.

Depicted in another embodiment, as shown in FIGS. 11A-11B, the ambigram coin 10 can include two laterally transversally aligned cut-out apertures, a right cut-out aperture 94, and a left cut-out aperture 96; the right aperture 94 disposed adjacent to a right side edge 74 of the coin body 12 and transversally aligned along an x-axis a distance from the left aperture 96 which is located adjacent to a left side edge 76. The right cut-out aperture 94 and the left cut-out aperture 96 are identical dimensioned in equal size and shape having side walls having a thickness $T^4$ equal to the thickness $T^1$ of the side edge 20.

In this exemplary embodiment, as shown in FIGS. 11A-11B to provide the vertical rotation of the ambigram coin 10, the coin body 12 includes two rotatable connector pin devices, a right rotatable connector pin device 104, and a left rotatable connector pin device 102. The right rotatable connector pin device 104 includes a first pin receptacle 106 and a first eye bolt 110; and the left rotatable connector pin device 102 includes a second pin receptacle 146 and a second eye bolt 112. The first eye bolt 110 has a first loop portion 98 and first male threaded shank portion 152, and the second eye bolt 112 has a second loop portion 100 and a second male threaded shank portion 154.

As depicted in FIG. 11A the first loop portion 98 of the first eye bolt 110 is connected to the right aperture 94 of the ambigram coin 10 and a first end $30^1$ of the displaying device 78, a link necklace 30 is firmly attached to a distal end 106a of the right rotatable connector pin device 104; and the second loop portion 100 of the second eye bolt 112 is connected to the left aperture 96 of the ambigram coin 10 and a second end $30^2$ of the displaying device 78, the link necklace 30 is firmly attached to a distal end 108a of the left rotatable connector pin device 102.

At a closer inspection, the first pin receptacle 144 includes a first cylindrical core having a cavity including a first female annular threads 148 as a means for compatible vertical rotatable detachment and reattachment to a first male threaded shank 152 of the first eye loop 110, and the second pin receptacle 146 includes a second cylindrical core having a second cavity including a second female annular threads 150 as a means for compatible vertical rotatable detachment and reattachment to a second male threaded shank 154 of the second eye loop 112 so that the ambigram coin 10 may be installed on a displaying device 78 at a selected vertical display position 90 relative to the x-axis in a vertical obverse display position such that the cut-out ambigram "ME" 24 is displayed, and by vertically rotating the ambigram coin 10 in a measure of approximately 180 degrees in the vertical reverse display position such that the cut-out hollow ambigram "WE" 24a is displayed, as shown in FIG. 11B.

As illustrated in FIGS. 11A and 11B, a first end $30^1$ of the displaying device 78, a link bracelet 30 is firmly attached to a distal end 106a of the right rotatable connector pin device 104. At a proximal end 106b of the right rotatable connector pin device 104 the compatible first threaded male shank 152 of the first eye bolt 110 is inserted and securely threaded therewith the first female interior annular threads 148 of the first pin receptacle 144. The circular looped end 110b is coupled to the ambigram coin 10. At a proximal end 108b of the left rotatable connector pin device 102 the compatible second male threaded shank 154 of the second eye bolt 112 is inserted and threaded therewith the second female annular threads 150 of the second pin receptacle 108.

In use, by turning each of the first pin receptacle 106 and the second pin receptacle 108 in a counter-clockwise rotation, the first male threaded shank 152 and the second male threaded shank 154 are loosened so that the first eye bolt 110 and the second eye bolt 112 can be freely rotated so that the ambigram coin 10 can be orientated in the obverse display position 90 for displaying the cut-out hollow ambigram "ME" 24, as depicted in FIG. 11A.

The ambigram coin 10 is secured in this position by rotating the first pin receptacle 106 and the second pin receptacle 108 in a clock-wise direction and locking the ambigram coin 10 in the obverse display position 92 to display on a link necklace 30 worn by the user.

Alternatively, as depicted in FIG. 11B the ambigram coin can be easily vertically rotated by rotating in a counter-clockwise direction the first pin receptacle 106 and the second pin receptacle 108 so that the respective first male threaded shank 152 and the second male threaded shank 154 are loosened so that the ambigram coin 10 can be vertically rotated in a measure of approximately 180 degrees about an x-axis and thereby orientated in the reverse display position 92 so that the cut-out open ambigram "WE" 24a is displayed when the link necklace 30 is worn as a piece of jewelry by the user.

It is critical, therefore, that the right aperture 94 and left aperture 96 are transversally aligned spaced a distance apart along the x-axis of the coin body 11 wherein the cut-out open ambigram "ME" 24 is centrally disposed, so that the ambigram coin 10 can be orientated symmetrically by the user for wear in two vertical display positions, the obverse display position 90 and the reverse obverse display position 92, whereby when the ambigram coin 10 is in the obverse display position 90 the cut-out open ambigram "ME" 24 is displayed, and, subsequently, when the ambigram coin 10 is rotated a measure of approximately 180 degrees about the medial x-axis the ambigram coin is in the reverse display position 92 the cut-out open ambigram "WE" 24b is displayed.

Depicted in FIGS. 12-19 the ambigram coin 10 includes a connecting device as a means to directly receive the displaying device 78. The connecting device can be at least one metallic ring 80, or a series of connected metallic rings 126, as a means for coupling the superior aperture 54 to a displaying device 78, or as a means for coupling the inferior aperture 62 to a displaying device 78 such as a chain bracelet 120, a bangle bracelet 122, a necklace 114, a pair of earring hoops, a first earring hoop 128$^1$, and a second earring hoop 128$^2$, a watch 124, a ribbon baby pacifier 140, dog collar 136, or a cufflink 132.

The connecting device can be a metallic ring, lobster clasp, eye bolt, spring pin, tension pin, roll pin or coiled spring pin, conventionally used in coupling jewelry thereto.

Figure 12:
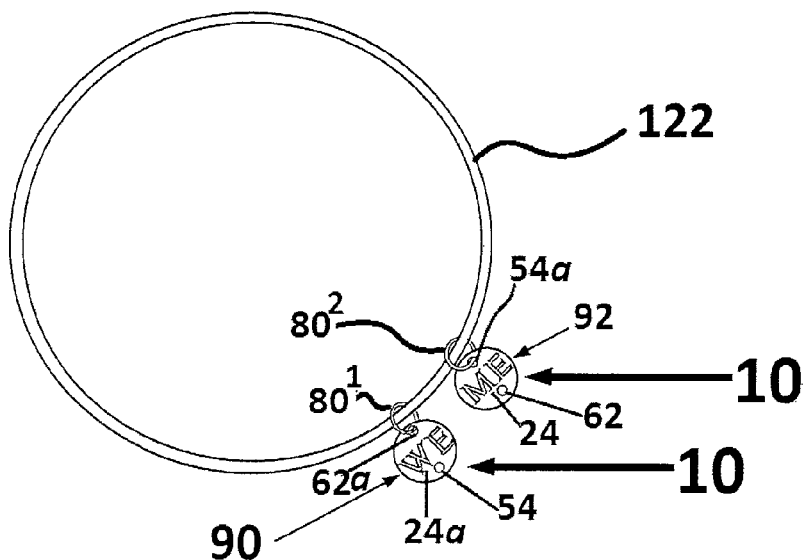
FIG. 12 is a perspective view of another exemplary embodiment of the ambigram coin displayed on a bangle bracelet.

In a preferred embodiment, as shown in FIG. 12 the connecting device is at least one metallic ring 80 conventionally used to link charms to necklaces 118, bracelets 130, bangles 122, earring hoops, a first earring hoop 128$^1$, and a second earring hoop 128$^2$, and similar jewelry. The metallic ring 120 is coupled to either one of the superior aperture 54 or the inferior aperture 62 of the ambigram coin 10 and therethrough a displaying device 78 is passed through the metallic ring 120 that allows the user to wear and/or display the ambigram coin 10 as jewelry for displaying the cut-out open ambigram "ME" 24 or "WE"24a.

As shown in FIG. 12 two ambigram coins (10) are displayed extending from a bangle bracelet 122 for a user to wear around his or her wrist as a piece of jewelry, a first ambigram coin 10 including the cut-out ambigram "ME" 24; and a second ambigram coin 10 including the cut-out ambigram "WE" 24a. A first metallic ring 120 is passed through the opening 54a of the superior aperture 54 of the first ambigram coin 10 including the cut-out ambigram "ME" 24 and the bangle 122 is passed through the opening of the first metallic ring 120 so that the ambigram coin 10 is in the obverse display position 90 showing the cut-out ambigram "ME" 24. A second metallic ring 120 is passed through the opening 62a of the inferior aperture 62 of the second ambigram coin 10 including the ambigram "WE" 24a and the bangle 122 is passed though the opening of the second metallic ring 120 so that the ambigram coin 10 is in the reverse display position 92 showing the cut-out ambigram "WE" 24a.

This exemplary embodiment clearly shows the novelty and the versatility of the ambigram coin 10 in that depending upon whether the user chooses to display the ambigram "ME" 24 or in the alternative the ambigram "WE" 24a he or she, merely chooses to pass the metallic ring 120 through the superior aperture opening 54a to display the cut-out ambigram"ME" 24 from the bangle 122, or by rotating the ambigram coin 10 180 degrees about the x-axis passes the metallic ring 120 through the inferior aperture opening 62a to display the ambigram "WE" 24a from the bangle 122.

Figure 13:
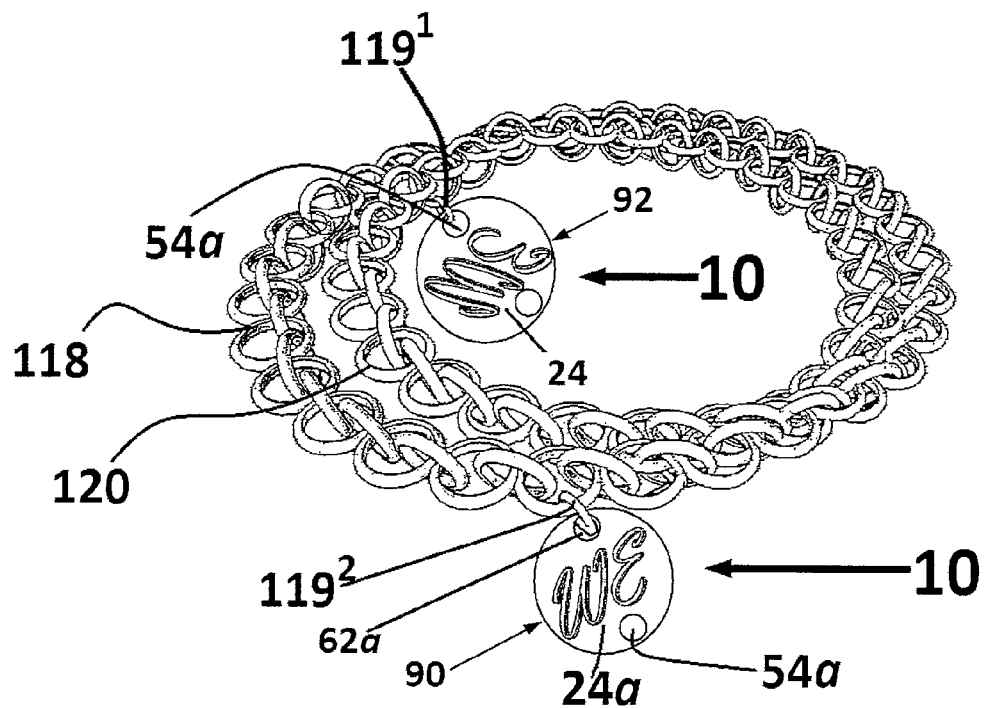
FIG. 13 is a perspective view of another exemplary embodiment of the ambigram coin displayed on two chain bracelets.

In another embodiment, as shown in FIG. 13, the versatility of the ambigram coin 10 is featured as the ambigram coin 10 is coupled by a metallic ring 120 to a first chain bracelet 118 and to a second chain bracelet 120 so that the ambigram coin 10 can be worn displayed on two chain bracelets 118 and 120 stacked together as jewelry. As shown in FIG. 13, and as indicated previously, because of the novelty of the ambigram coin 10, the wearer can use the chain bracelet 118 and 120 as a means to display the ambigram coin 10 in the obverse display position 90 to display the cut-out ambigram "ME" 24, or the wearer can vertically rotate the ambigram coin 10 to display the ambigram coin 10 from the chain bracelet 130 in the reverse display position 92 to display the cut-out ambigram "WE" 24a. At a closer look into FIG. 13, a first metallic ring 119$^1$ is coupled to the first chain bracelet 118 and the first metallic ring 119$^1$ is passed through the superior aperture opening 54a of the ambigram coin 10 so that the ambigram coin 10 is displayed in the obverse display position 90 showing the cut-out ambigram "ME" 24. In the alternative, a second metallic ring 119$^2$ is coupled to the second chain bracelet 120 therethrough the inferior aperture opening 62a so that the ambigram coin 10 is displayed from the second chain bracelet 120 in the reverse display position 92 for the user to wear around his or her wrist displaying the ambigram "WE" 24a.

In another aspect of the invention, the user can give one of the chain bracelets 118 or 120 having the cut-out ambigram "ME" 24 or the cut-out ambigram "WE" 24a displayed, respectively, to a recipient to show that the giving person is there for them in the recipient's time of loss, or need for companionship.

While displaying devices 78 are shown in FIGS. 7A-20A, and while displaying devices are shown coupled to a connecting devices, namely, for example, a metallic ring 80 to display the ambigram coin 10, as depicted in FIGS. 12-20A, the displaying devices 78 and the connecting devices are not to be restricted to those described here. It is contemplated that the unique feature of the herein described invention can and will be employed with any and all displaying devices 78 and connecting devices as known in the art for displaying jewelry. In addition, as illustrated in FIGS. 12 and 13 more than one ambigram coin 10 can be displayed on a displaying device 78.

As further exemplified in FIG. 14, the ambigram coin 10 is coupled to the displaying device, a watch 124. The ambigram coin 10 including the cut-out ambigram "me" is coupled to a series of metallic rings 126 wherein a first metallic ring 126 is passed through the superior aperture opening 54a of the ambigram coin 10 so that the cut-out hollow ambigram "me"24 is in the obverse display position 90 displaying the cut-out hollow ambigram "me"24 and a second link 130a is coupled to a portion of a watch band 126a. As described earlier, the ambigram "we" 24a can be displayed by vertically rotating the ambigram coin 10 approximately 180 degrees to the reverse display position 92 and passing the first metallic ring 120 through the inferior aperture opening 62a of the ambigram coin 10.

Without departing from the scope of the present invention, the ambigram coin 10 can be displayed on a pair of earring hoops, a first earring hoop 128$^1$, and a second earring hoop 128$^2$, as shown in FIGS. 15A and 15B. As shown in FIG. 15A the ambigram coin 10 includes the centrally located cut-out ambigram "ME" 24 having a first metallic ring 130$^1$ passed through the superior aperture opening 54a and having a first earring hoop 128$^1$ passed through the first metallic ring 130$^1$ so that the cut-out ambigram "ME" 24 is displayed on a first earring hoop 128$^1$ worn by the user. In the alternative, as shown in FIG. 15B the ambigram coin 10 is vertically rotated approximately 180 degrees to the reverse display position 92 so the cut-out ambigram "WE" 24a is displayed having a second metallic ring 130² passed through the inferior aperture opening 62a and having a second earring hoop 128² passed through the second metallic ring 130² so that the cut-out ambigram "WE" 24a is displayed on a second earring hoop 128² worn by the user.

In another embodiment of the present invention, the ambigram coin 10 including the ambigram "ME" 24 is coupled to a series of alternating metallic rings 133 of a cufflink 132, as shown in FIG. 16, and the ambigram coin 10 including the ambigram "WE" 24a is coupled to the metallic rings 133 on the opposing side of the cufflink 132.

Figure 17:
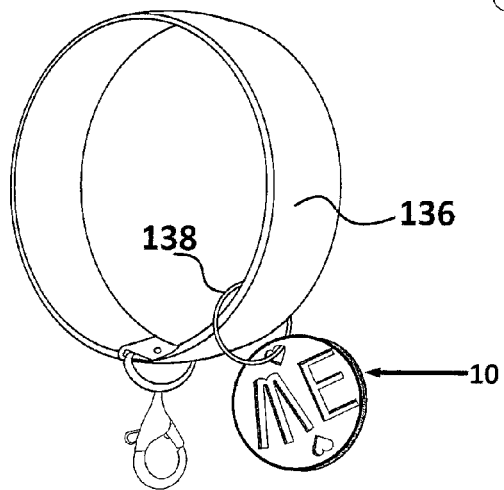
FIG. 17 is a perspective view of another exemplary embodiment of the ambigram coin displayed on dog collar.

In yet another embodiment, the ambigram coin 10 is displayed on a dog collar 136. As shown in FIG. 17, a larger metallic ring 138 can be coupled to the dog collar 136; and the metallic ring 138 is passed through the superior aperture opening 54a of the ambigram coin 10 so that the ambigram coin is orientated in the obverse display position 90 showing the cut-out hollow ambigram "ME" 24 and therewith the ambigram coin 10 is mounted upon the leather strap of the dog collar 132 for a user to place around the neck of a dog to wear.

As explained above, the ambigram coin 10 can be vertically rotated a measure of approximately 180 degrees to the reverse display position 92 so that the cut-out ambigram "WE" 24a is displayed. In addition, the metallic ring 138 can be passed through the inferior aperture opening 62a so that the ambigram coin 10 is suspended from the dog collar 132 in the reverse display position so that the cut-out ambigram "WE" 24a is displayed.

Figure 18:
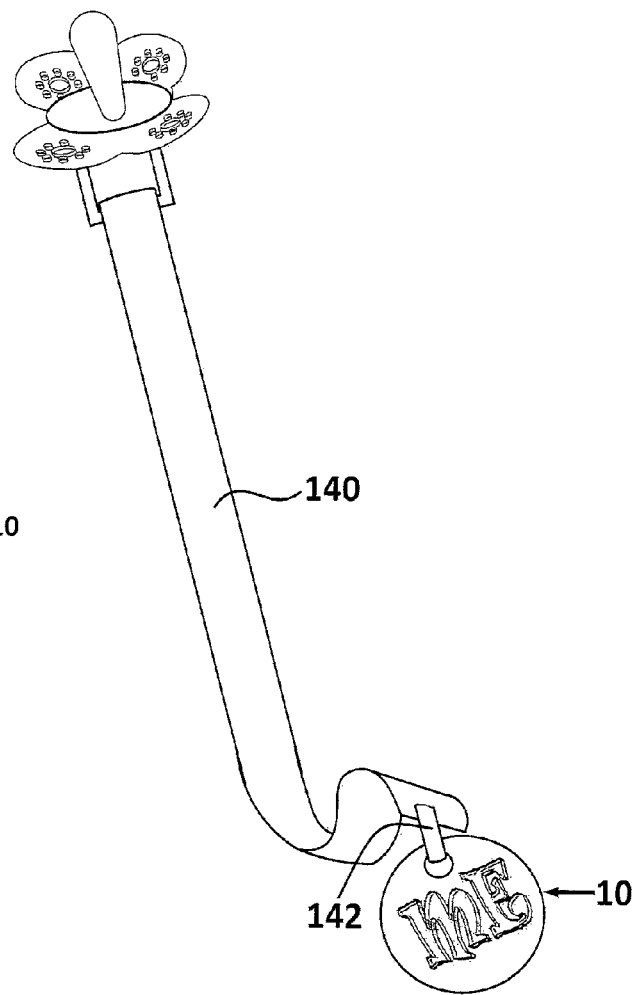
FIG. 18 is a perspective view of another exemplary embodiment of the ambigram coin displayed on ribbon pacifier.

In yet another embodiment, the ambigram coin 10 including the ambigram "ME" 24 is coupled to a ribbon 136 of a baby's pacifier 128 as shown in FIG. 18.

Figure 19:
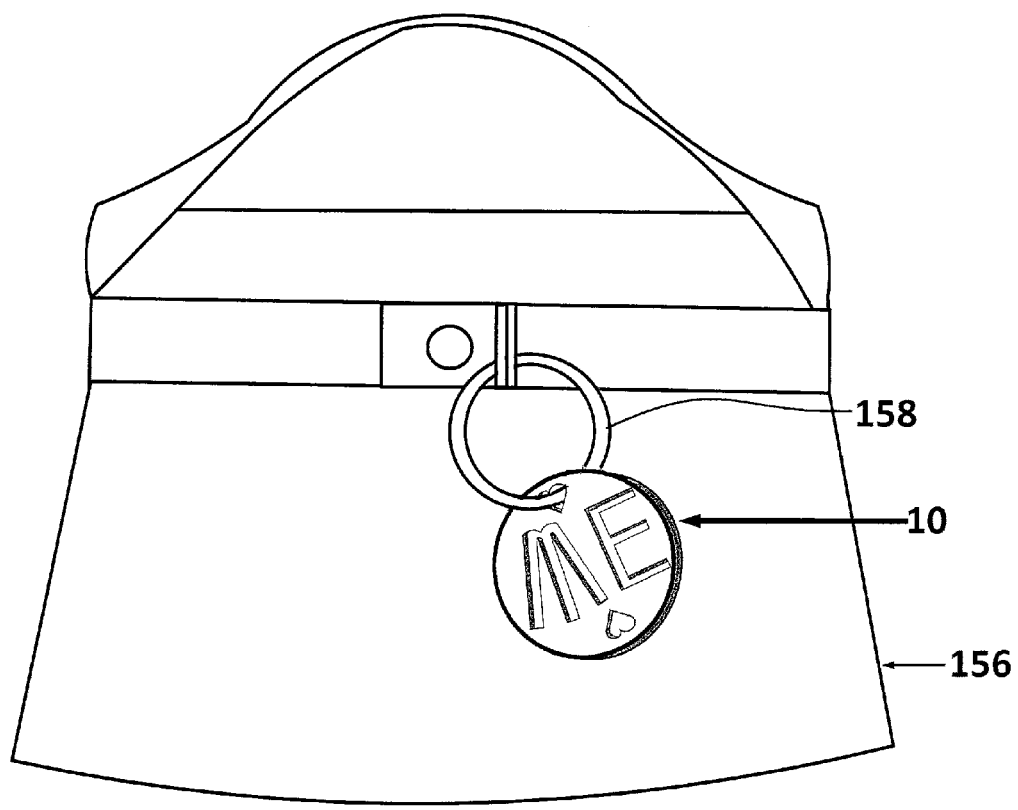
FIG. 19 is a perspective view of another exemplary embodiment of the ambigram coin displayed on purse.

In yet another embodiment, the ambigram coin 10 including the ambigram "ME" 24 is coupled to a purse 156, as shown in FIG. 19.

While displaying devices are shown in FIGS. 7A-7B, 8-10B, and 20A, and while displaying devices are shown coupled to a connecting devices 80, namely, a metallic ring 120 to display the ambigram coin 10 in FIGS. 11A-19, the displaying devices and the connecting devices are not to be restricted to those described here. It is contemplated that the unique feature of the herein described invention can and will be employed with any and all displaying devices and connecting devices as known in the art for displaying jewelry. In addition, as illustrated in FIGS. 12-13 more than one ambigram coin 10 can be displayed on a displaying device.

According to another aspect of the invention, as shown in FIGS. 20A-20E an ambigram coin kit 200 is provided including the elements including an ambigram coin 10, a displaying device 78, a printed gift card 210 including indicia 220 and instructions 218, a pre-composed message printed on note paper 212, a pocket 214, and a gift box 216. In this aspect the ambigram coin kit 200 can be presented by a person to a recipient who has lost a loved one, or a recipient who is facing the daily challenges of a serious illness, in keeping with which the invention endeavors to provide a means to palliate the sadness of the recipient and to assuage the recipient's feelings of wrenching sadness, aloneness and grief.

The ambigram coin kit 200 can include at least one ambigram coin 10 comprising a principal legend cut-out ambigram 22 centrally located therethrough the central portion 38 of the ambigram coin body 12. The cut out ambigram legend 22 includes the cut-out ambigram 22 including the hollow letter "M" 26 and "E" 28 to form the cut-out ambigram "ME" 24 so that the obverse display position displays the cut-out ambigram "ME" 24 and, subsequently, when the ambigram coin body 12 is vertically rotated 180 degrees about an x-axis to the reverse display position 92, the cut-out ambigram "WE" 24a is displayed.

In a more detailed description, as illustrated in FIG. 20 and referring back to FIGS. 1-3B the ambigram coin 10 comprises a coin body 12 comprising a solid field 14 which is a flat portion of the ambigram coin's 10 obverse side 16 and reverse side 18 generally in the shape of a circle. The field 14 includes a superior portion 36, an inferior portion 40, and a central portion 38 therebetween, the central portion 38 including the cut-out open ambigram legend 22 therethrough. The field 14 is limited by three sides; an obverse side 16, a reverse side 18, and an edge side 20. The obverse side 16 and the reverse side 18 each has a radius $r^1$, diameter $D^1$, and circumference $C^1$ that are identical in size and shape, a medial x-axis, illustrated by phantom dotted line x-axis and a medial y-axis, illustrated by phantom dotted line y-axis; and a third side, the edge side 20 which is the outer border of the ambigram coin 10, as illustrated in FIGS. 3A and 3B in a perspective view of the ambigram coin 10.

Referring in more detail to FIG. 19 and referring back to FIGS. 1-3B, the cut-out open ambigram legend 22 includes the cut-out open letters "M" 26 and "E" 28 horizontally ordered right to left in the central portion of the field 12 along the medial x-axis when the ambigram coin is displayed in an obverse display position 90. Each letter, "M" 26 and "E" 28 of the ambigram legend 22 is hollow formed by the cutting out of the shape of the letter "M" 26 and the shape of the letter "E" 28 from the solid central portion of the field 14 by using a plasma cutter, the method of which is described in more detail below. Thereby, each cut-out open letter, "M" 26 and "E" 28 is cut therethrough from the obverse exterior surface 16a to the reverse exterior surface 18a of the field 14 of ambigram coin 10 to form the hollow letters "M" 26 and "E" 28 which displays the hollow ambigram "ME" 24 when displayed in the obverse display position 90 and displays the ambigram "WE" 24a including the hollow letters "W" 24a and "E" 28a when rotated approximately 180 degrees to a reverse display position 92.

Referring to FIG. 20A, the ambigram coin 10 further includes two apertures, a heart-shaped superior aperture 86 and a heart-shaped inferior aperture 88 which are each identical in size and shape cut-out hollow openings generally in the shape of a heart 84. The superior aperture 86 circumvents a superior heart-shaped opening; and the inferior aperture 62 circumvents an identical inferior heart-shaped opening. The superior aperture 86 is preferably disposed adjacent to a top edge 70 of the coin body 12 and transversally aligned along the medial y-axis a distance from the heart-shaped inferior aperture 88 which is disposed adjacent to an opposing bottom edge 72 of the coin body 12.

Now making reference to FIG. 20A, the ambigram coin kit 200 includes the displaying device 78, namely, a suede cord 82, assembled to the ambigram coin such that the suede cord is passed therethrough the opening of the superior heart-shaped aperture 86 so that the obverse display position 90 displays the cut-out ambigram "ME" 24. In the alternative, the suede cord 82 can be passed through the opening of the inferior heart-shaped aperture 88 so that the reverse display position 92 displays the cut-out ambigram "WE" 24a.

In addition, the suede cord 82 provides a holding device such that when the ambigram coin 10 is placed within the pocket 214, provided in the ambigram coin kit 200, as shown in FIG. 20B, the ambigram coin 10 can be easily retrieved out of the pocket 214 by the recipient or user of the ambigram coin 10.

The pre-printed gift card 210, as shown in FIG. 20C, including indicia addressed "TO: a recipient, and "FROM" a person giving the ambigram coin 10, the gift card 210 is headlined with indicia 220. The pre-printed gift card 210 can be addressed to [TO:] a recipient who has suffered a loss of a loved one or who is suffering through a serious illness, from [FROM:] a person giving the ambigram coin 10. The printed gift card 210 is headlined with the indicia 220, preferably, that which is emblematic to what the invention endeavors to provide to the recipient that he or she is not alone because now the recipient possess the ambigram coin 10 symbolically annunciating to keep the giver "Me" in your pocket and think of the giver and recipient consubstantially as "ME" and "WE".

The ambigram coin kit 200 includes instructions 220, printed on the gift card 210 as shown in FIG. 19C that provide the use of the ambigram coin 10 including the instructions 220 which recite the steps: Please, take "ME" and vertically rotate a measure of 180 degrees to make "WE".

As such, the ambigram coin kit 200 provides the pocket 214 into which the ambigram coin 10 is placed and kept. The pocket 214, as shown in FIG. 20B is a stand-alone conformal pocket 214 including a front panel 252 and a rear panel 254 wherein the pocket 214 includes a lining, having a front panel lining 258 (not shown) and a rear panel lining 260. The front panel 252 and front lining 2 bound by a peripheral marginal seam 242 to the rear panel 254 and rear panel lining 260 forming four sides, a vertically orientated left side 238 and a laterally opposing right side 240; and a bottom diagonal right side 244 and a bottom left diagonal side 246, the bottom diagonal right side 244 meeting the bottom diagonal left side 246 at an apex 232; a top opening 228 defined by a front edge 234 and a rear edge 236, the front edge 234 bound by the lateral right side 240 and the opposing lateral left side 238 of the pocket 214, the rear edge 236 bound by the lateral right side 240 and the opposing lateral left side 238 of the pocket 214. The top opening 228 can be closed by a fastening means.

In a preferred embodiment the fastening means is a magnetic snap 224 having a male 226 (not shown) fastening structure and a corresponding female 226$^1$ corresponding fastening structures which when coupled together place the top opening 228 of the pocket 214 in a closed position to secure the ambigram coin 10 therein. The magnetic snap 224 can be easily opened and the ambigram coin 10 can be readily retrieved from the pocket 214 by the user by pulling on the suede cord 82, shown in FIG. 20A. The pocket 214, in the preferred embodiment, includes a button 230 attached on the front panel 252 for aesthetic purposes.

The bottom side edges of the pocket are on a diagonal forming a right bottom diagonal edge 244 and a left bottom diagonal edge 246 so that the circumferential edge side 20 of the ambigram coin 10 sits easily in the bottom of the pocket 214. The pocket 214 can be manufactured using a variety of fabrics having a variety of patterns, colors, themes, and motifs.

The pocket 214, in a preferred embodiment, includes a magnetic snap 224 closure as a fastening means. In another embodiment the pocket can include a fastening means including any one of a snap, squeeze frame closure, magnet or ferromagnetic element.

The pocket 214 can be manufactured using any material selected from soft materials including, cotton, linen, satin, silk, corduroy, flannel, jersey, polyester, suede, or any combinations therewith. The pocket 214 can be made using fabrics of a variety of colors, decorative patterns, or motifs. In a preferred embodiment, the pocket 214 is made with a fabric that is washable. Preferably, the material of the lining 222 is a fabric including a contrasting color or motif to the front panel 252 and the rear panel 254 of the pocket 214.

In another embodiment the lining 222 can include a magnetic or ferromagnetic material to releasably maintain the ambigram coin 10 within the pocket cavity.

The pre-composed message printed on note paper 212, as shown in FIG. 20D is provided for the recipient to read when presented with the ambigram coin 10 including the cut-out ambigram "ME" 24, and whenever the recipient chooses to do so for inspiration, consolation, and comfort. The palliative message, which can be signed by the person giving the ambigram coin, provides words of compassion and thoughtfulness, introspect of one who has gone through a loss of his or her own to provide the recipient with a hopeful message given together with the ambigram coin 10 including the cut-out ambigram "ME" 24 such that when the ambigram coin 10 is vertically rotated a measure of approximately 180 degrees the ambigram "WE" 24a is displayed.

The gift box 216, as shown in FIG. 20E is provided with a label 217 with the identification of the ambigram coin 10, the gift box 216 provides a means to hold the elements of the ambigram coin kit 200 including the ambigram coin 10 assembled to the displaying device 78, the printed gift card 210 including instructions 220, the pre-composed message printed on note paper 212, the pocket 214, and the gift box 216 can be provided with the instructions 218. The gift box 216, preferably, includes a closeable container 250 having a removable lid 248 so that the user can remove the lid 248 from the container 250, place the elements of the ambigram coin kit 200 therein and replace the lid 248 on the container 250 to secure the elements of the ambigram coin kit 200 therein.

The gift box 216, in the preferred embodiment, is approximately 3.5 inches square and is made of natural colored light weight cardboard having a cotton padding interior. In another embodiment, the gift box 216 can be manufactured using any conventional materials to make a gift box 216 to hold the elements of the ambigram coin kit 200 the materials including card board, metal, plastic, wood, or glass.

In yet another exemplary embodiment of the present invention, the ambigram coin kit 200 of the invention further comprises a plurality of ambigram coins 10, plurality of displaying devices 78, a plurality connecting devices 80, a plurality of pre-printed gift cards 210, a plurality of instructions 218, a plurality of pre-printed message printed on note cards 212, a plurality of pockets 214, and a plurality of gift boxes 216 so that the user has a choice for creating one or more ambigram coins 10 made in a variety of sizes, thicknesses, and metals which can be displayed on a variety of displaying devices 78 and connecting devices 80.

Each of the ambigram coins 10, includes the cut-out hollow ambigram "ME" 24 displayed therethrough the obverse side 16 in the obverse display position 90 which when vertically rotated a measure of 180 degrees displays the cut-out hollow ambigram "WE" 24a in the obverse display position 92, as shown in FIGS. 4B, 5B, and 6B. As shown in FIGS. 4A-6B, the ambigram coins 10 can be cut-out therethrough having the hollow letters "M" 26 and "E" 28 formed of a plurality of fonts for the user to choose from to customize to a particular recipient, as described below in the process of manufacture.

The plurality of ambigram coins 10 can include a selection of ambigram coins 10 including a superior aperture 54 and an inferior aperture 62, and a selection of ambigram coins 10 including a right aperture 94 and a left aperture 96.

The ambigram coin kits 200 of the invention may contain a plurality of ambigram coins 10 all of which may be of or a variety of sizes as shown in FIGS. 1-19. The ambigram coins 10 can be made in a diameter in a variety of measures that are sized according to the selected displaying device and connecting device selected by the user.

The plurality of the ambigram coins 10 may be selected from ambigram coins manufactured with a heavy metal, or a light metal. In addition, the material selection should also be carefully selected to optimize the accompanying displaying device 78 while maintaining what the ambigram coin 10 endeavors to exemplify that the recipient of the ambigram coin 10 is not alone.

The ambigram coin kits 200 therefore, includes a plurality of displaying devices 78 selected from a group comprising of cords 82, necklaces 114, chain bracelets 118 and 120, link chain 30, bangles 122, key ring 116, pair of earring hoops 128[1] and 128[2], cufflinks 132, watches 124, dog collar 136, ribbon baby pacifier 140, as described above.

The choice of the displaying device 78 should, also, be selected to accommodate the size and weight of the selected ambigram coin 10. In the preferred embodiment, a suede cord 82 accommodates a large weighted ambigram coin 10, as shown in FIGS. 7A and 7B; 8A and 8B; and FIG. 19A so that the user can pull the ambigram coin 10 from the pocket 214 and be reminded of the hollow ambigram "ME" and the hollow ambigram "WE" and that the user is not alone. In another exemplary embodiment, a thin bangle 122 as shown in FIG. 12 coupled to a metallic ring 80 accommodates a small sized ambigram coin 10 which forms an attractive piece of jewelry to be worn by a user given to a recipient as a gift displaying the ambigram coins 10 displaying the cut-out hollow ambigram "ME" 24 and the cut-out ambigram "WE" 24a reminding the recipient that she or he is not alone.

The plurality of displaying devices 78 to be selected by the user can be installed through either one of the superior aperture opening 54a or the inferior aperture opening 62a of each of the ambigram coins 10. In the alternative, the displaying device 78 can be passed though the right aperture opening 94a and the left aperture opening 96a and secured therein, as shown in FIGS. 11A-12B.

The ambigram coin kits 200 can include a plurality of connecting devices 80. As is known by one skilled in the art, the coupling devices 80 can include a plurality of rings, loops, or clasps, lobster clasps, bail clasps conventionally used to couple jewelry to displaying devices. Therefore, the ambigram coin kits 200 can provide connecting devices 80 to couple the displaying device 78 to the selected ambigram coin 10.

The ambigram coin kits 200, can include a plurality of pre-printed gift cards 210 including the indicia: TO: and FROM: pre-printed in a variety of colors and fonts. Further, the gift cards 210 include a header including indicia 220 pre-printed in a variety of colors and fonts, so that the user can customize the gift card to a particular person receiving the ambigram coin 10. In the preferred embodiment, the printed gift card 210 is on a note card approximately 3.25 inches square. A variety of fonts and font colors may be used to display the instructions. For example, the instructions recite the steps: please, take "ME" and vertically rotate a measure of 180 degrees to make "WE".

The ambigram coin kit 200 includes instructions 218 that suggest the use of at least one ambigram coin 10 coupled to at least one displaying device 78 to orient the ambigram coin 10 to a first displaying obverse display position 90 displaying the hollow cut-out ambigram "ME" 24, or second displaying position 92 displaying the cut-out hollow ambigram "WE" 24a. The instructions 218 provide the steps: selecting the displaying device 92; pulling the displaying device through the superior aperture opening 54a; orientating the ambigram coin 10 with the ambigram coin 10 in the obverse display position 90; and the cut-out hollow ambigram "ME" 24 is displayed.

The last step providing: holding the ambigram coin 10 and therewith, please, take "ME" and vertically rotate a measure of 180 degrees to make "WE".

In the alternative, the instructions provide the steps: selecting the displaying device 92; pulling the displaying device through the inferior aperture opening 62a; orientating the ambigram coin 10 with the ambigram coin 10 in the reverse display position 92; and the cut-out hollow ambigram "WE" 24 is displayed. The last step providing: holding the ambigram coin 10 and therewith, please, take "WE" 24a and vertically rotate a measure of 180 degrees to make "ME" 24.

Further, the ambigram coin kits 200 can include a plurality of pre-written messages printed on note paper 212 based in a variety of benevolences focused to loss of a loved one who may be an adult or child, or benevolences focused to a particular serious illness, and more particularly whether a transitory or terminal illness. The letter is printed on a folded note card that is approximately 3.25 inches square when folded. A variety of fonts and font colors may be used to display the written words of the message. In another embodiment a note card is provided that is left blank so that the user may customize a note personally to a specific intended recipient.

The ambigram coin kits 200 can include a plurality of pockets 214 made in a variety of materials and colors so that the user can customize the color of the pocket 214 for a particular person to whom the user is giving the ambigram coin 10.

The ambigram coin kits 200 can include a plurality of gift boxes 216 conformal to the size of the ambigram coin 10 chosen by the user. The size of the gift box 216 is in the range of approximately slightly greater than 3.5 inches to 4.0 inches. In addition, the gift box 216 may include a soft cotton cushion to provide padding to the ambigram coin 10.

The gift box 216, in the preferred embodiment, is approximately 3.5 inches square and is made of natural colored light weight cardboard having a cotton padding interior. In another embodiment, the gift box 216 can be manufactured using any conventional materials to make a gift box 216 to hold the elements of the ambigram coin kit 200 the materials including card board, metal, plastic, wood, or glass.

Ambigram coins 10 can be included in ambigram coin kits 200, and, or may be made separately available.

Method of Manufacturing

A preferred method of manufacturing of making the ambigram coin 10 is by using a computer numerical controlled plasma cutter. Plasma cutting is a process that is used to cut steel and other metals (or sometimes other materials) of different thicknesses using a plasma torch. In this process, compressed air (in some units an inert gas) is blown at high speed out of a nozzle; at the same time an electrical arc is formed through that air from the nozzle to the surface being cut, turning some of that air to plasma. The plasma is sufficiently hot to melt the metal being cut and moves sufficiently fast to blow molten metal away from the cut. The process is comprised of the following steps of:

12. Programming the ambigram coin 10 specifications into the plasma cutter computer A plasma cutting machine is suitable for applications involving computer numerical controlled (CNC) cutting. The plasma cutting machine is connected to a computer having the appropriate computer assisted design software, to perform the plasma cutting function. This software is programmed with the specifications of each ambigram coin 10.

While each ambigram coin 10 is similar in thickness of approximately $T^1$, circumference $C^1$ and diameter $D^1$, the font of the specific ambigram may be different, as discussed above. Standard fonts are available through the software and also may be imported from other sources into the software. The fonts of the cut-out hollow letters "M" 24 and "E" 28 to form the cut-out hollow ambigram "ME" 24 are preferably sized to fit in their entirety within the central portion 38 of the field 14 of the ambigram coin body 12 without extending beyond the edge side 20 of the coin body 12.

Consequentially, when the ambigram coin 10 is vertically rotated a measure of approximately 180 degrees the fonts of the hollow letters "W" 24a and "E" 28a to form the cut-out hollow ambigram "WE" 24a fit in their entirety within the central portion of the field 14 of the ambigram coin body 12 without extending beyond the edge side 20 of the ambigram coin body 12. Therefore, only specific sized fonts that provide the required letter formation that will correctly and aesthetically display the cut-out hollow ambigram legend 22 in both the cut-out hollow ambigram "ME" 24 and when the ambigram coin 10 is vertically rotated a measure of approximately 180 degrees the cut-out hollow ambigram "WE" 24a are selected as base fonts. These base fonts are then modified through the application and programming of the computer software to create the appropriate dimension, curvature and spread of the cut-out hollow letters "M" 26 and "E" 28 for each ambigram coin 10 to be cut into the metal. These computer files are then saved and reused for future cutting. Through the appropriate creation and setup of each computer file, the plasma cutter can be programmed to cut multiple ambigram coins 10 with multiple fonts at the same time.

13. Loading the sheet of steel onto the plasma cutter.

The ambigram coin can be manufactured using any one of gold, platinum, silver, bronze, copper, brass, nickel, pewter, wrought iron, iron, lead, aluminum, steel and stainless steel, bimetallic, bouillon, or an alloy. In the preferred method of manufacturing of the ambigram coin 10, a sheet of steel ⅛" thick and up to 4 feet by 4 feet square is loaded onto the computer numerical controlled (CNC) cutting table. Using the plasma cutting software, the appropriate pre-programmed file is selected and the software procedures for communicating with the plasma cutter are utilized.

14. Cutting the ambigram coins 10. The plasma cutter begins cutting the ambigram coins 10 into the selected circular shape and size of the ambigram coin 10 and including the cut-out hollow ambigram legend 22 consisting of the cut-out hollow letters "M" 26 and "E" 26 to form the cut-out hollow ambigram "ME" 24 cut from the obverse side 16 exterior surface 16a of the field 14 therethrough to the reverse side exterior surface 18a so that when the ambigram coin 10 is vertically rotated a measure of approximately 180 degrees to the reverse side position 92 the cut-out hollow ambigram legend 22 consisting of "WE" 24a is displayed from the reverse side 18 exterior surface 18a to the exterior surface 16a of the obverse side 16 of the field 14 which make the ambigram coin 10 unique and novel.

15. Tumbling of the cut-out ambigram coins 10 by a tumbler. The ambigram coins 10 are tumbled in the tumbler for approximately 8 hours to smooth the edges and brighten the surfaces. The tumbler is an electric rotating cylinder or drum with interior fins in it. The ambigram coins 10 are inserted in the tumbler along with an abrasive media. The mixing action of the tumbler peens or abrades to smooth the rough edges of the ambigram coins 10 and brightens the obverse 16a and reverse 18a exterior surfaces.

16. Removing the ambigram coins 10 from the tumbler. Upon completion of the tumbling process, the ambigram coins 10 are removed from the tumbler, laid out on a work surface.

17. Air-blowing the ambigram coins to remove any residual metal dust from the tumbling process.

18. Wire-brushing each ambigram coin 10. Each ambigram coin is machine wire-brushed or disc-sanded to remove any remaining slag or rough edges.

19. Inspecting the ambigram coins 10. Coins are then visually inspected. Any coins with severe imperfections visible to the naked eye are discarded. Remaining coins are deemed suitable for the final process.

20. Finishing the ambigram coins 10. The ambigram coins 10 are buffed and finished to further smooth the exterior surface and remove any impurities, hairlines created and provide a cleaner, smoother front and rear external surfaces as the ambigram coin is formed. Finishing processes may also include powder-coating, polishing, electroplating with silver or gold, chroming, or anodizing to color and harden as with aluminum.

21. Polishing the ambigram coins 10. The ambigram coins 10 can be polished, sand blasted, chemicaly etched, or further finished with the use of an abrasive delivered by air or water affixed to a disc or brush.

22. Painting the ambigram coins 10. The ambigram coins 10 can be painted with paint suitable for metal in a clear finish, metallic finish or any color of preference.

Other possible methods of manufacturing include stamping, casting, laser cutting, wood carving, punching, sheering, flame cutting, forging, routing, machining or three-dimensional printing. Other possible materials include wood, plastic, resin, bone or stone, precious minerals such as jade or crystals. As known to one skilled in the art dimensions may vary given the size of each letter in any selected font.

According to one embodiment, the method provides an ambigram coin 10 with a rim 32 and 34. In a preferred embodiment, the method creates a rimless ambigram coin 10, as shown in FIG. 1.

In a preferred embodiment, the ambigram coin 10 is manufactured using a heavy metal material that is resilient and rigid so that the ambigram coin 10 is provided which has automatically operable means for rigidly retaining the cut-out hollow ambigram 22, for example, "ME" 24 and "WE" 24a. The ambigram coin 10 is preferably manufactured using the heavy steel. It is important the metal used to manufacture the ambigram coin, in the preferred embodiment, has a relatively heavy weight because when the ambigram coin 10 is placed into a pocket or a recipient or user, the ambigram coin 10 provides weight which can be felt by the user in his pocket 214 as a reminder of the support and companionship of the person who gave him or her the ambigram coin 10 including the heartfelt ambigram "ME" 24 and "WE" 24a inspiriting the recipient of the ambigram coin 10 that he or she is not alone.

In another embodiment, the metal used to manufacture the ambigram coin 10 can be a light metal, for example, gold, silver, or platinum, so that the hollow ambigram 22 can be cut-out of the lighter metal to form the cut-out hollow ambigram "ME" 24 so that the ambigram coin 10 can be easily displayed as jewelry.

While only certain features of the invention have been illustrated and described herein, many modifications, substitutions, changes or equivalents will now occur to those skilled in the art. It is therefore, to be understood that this application is intended to cover all such modifications and changes that fall within the true spirit the invention endeavors to provide.

What is claimed is:

1. A system, comprising:
an ambigram coin including a coin body including a solid field portion having an obverse side and a reverse side, bound by a circumferential edge side,
the coin body having a medial x-axis and a medial y-axis;
the obverse side having a diameter equal to the diameter of the reverse side;
the circumferential edge side having a thickness $T^1$;
an obverse exterior surface having a surface area equal to a reverse surface area;
the solid field portion rigidly retains a cut-out hollow ambigram legend in a central portion;
the cut-out hollow ambigram legend having a cut-out hollow letter "M" aligned a distance along the solid field portion from a cut-out hollow letter "E" being ordered horizontally right to left along the medial x-axis in a vertical obverse display position to form the cut-out hollow ambigram "ME" such that vertically rotating the coin body a measure of 180 degrees about the medial x-axis to a vertical reverse display position the cut-out hollow ambigram legend has the cut-out hollow letter "W" and the cut-out letter "E" being ordered horizontally right to left along the medial x-axis to form the cut-out hollow ambigram "WE";
the cut-out hollow letters "M" and "E" each bordered by internal side walls which circumscribe each of the letters "M" and "E" are sized to fit in its entirety within the solid field portion of the coin body without extending beyond the edge side;
each of the side walls of the cut-out hollow letter "M" and the cut-out hollow letter "E" each having a thickness $T^2$ equal to the thickness $T^1$ of the side edge;
a superior aperture is disposed adjacent to a top edge longitudinally aligned along a y-axis a distance along the solid field portion from an inferior aperture disposed adjacent to a bottom edge such that the superior aperture and the inferior aperture are each disposed separate and remote from the cut-out hollow ambigram legend; and
the superior aperture and the inferior aperture each having an opening with identical size and structure and means by which the coin body is hung from a displaying device.

2. The system as recited in claim 1, wherein the solid field portion is flat having a smooth obverse exterior surface and a smooth reverse exterior surface.

3. The system as recited in claim 1, wherein the edge side is plain.

4. The system as recited in claim 1, wherein the edge side can be any one of the group comprising reeded, lettered, or decorated.

5. The system as recited in claim 1, wherein the edge side having a thickness $T^1$ is equal to the thickness $T^2$ of the internal side walls of the cut-out hollow letter "M" so that an obverse border and a reverse border of the cut-out hollow letter "M" is flush with the obverse exterior surface and reverse exterior surface of the solid field portion.

6. The system as recited in claim 1, wherein the edge side having a thickness $T^1$ is equal to the thickness $T^2$ of the internal side walls of the cut-out hollow letter "E" so that an obverse border and a reverse border of the cut-out hollow letter "E" is flush with the obverse exterior surface and reverse exterior surface of the solid field portion.

7. The system as recited in claim 1, wherein the letters "M" and "E" can be formed selected from any one of a variety of fonts sized such that the cut-out hollow letters "M" and "E" fit in its entirety within the solid field portion of the coin body without extending beyond the edge side.

8. The system as recited in claim 1, wherein the solid field portion is rimless.

9. The system as recited in claim 1, further comprises a circumferential rim selected from any one of the group comprising a smooth border, double border, ripped border, deviced border, corner border, wave border, or spiral border.

10. The system as recited in claim 1, wherein the shape of the coin body is a circle.

11. The system as recited in claim 1, wherein the shape of the coin body is any one of a variety of geometric shapes, including an oval, square, triangle, trapezoid, rectangle, octagon, pentagon, and heart, or any shape such that the cut-out hollow letters "M" and "E" fit in its entirety within the solid field portion of the coin body without extending beyond the edge side.

12. The system as recited in claim 1, wherein the coin body is resilient.

13. The system as recited in claim 1, wherein the coin body is manufactured using any one of metals selected from the group comprising of gold, platinum, silver, bronze, copper, brass, nickel, pewter, wrought iron, iron, and stainless steel, bimetallic, bouillon, an alloy, or any combination thereof.

14. The system as recited in claim 1, wherein the superior aperture and the inferior aperture are circular.

15. The system as recited in claim 1, wherein the superior aperture and the inferior aperture are identical heart-shaped apertures.

16. The system as recited in claim 1, wherein the displaying device is selected from the group comprising of necklaces, bracelets, anklets, earrings, chains, cords, and ribbons, said displaying device passed through an opening of the anterior aperture whereby the ambigram coin may be worn as jewelry.

17. The system as recited in claim 1, wherein the displaying device is selected from the group comprising of necklaces, bracelets, anklets, earrings, chains, cords, and ribbons, said displaying device passed through an opening of the inferior aperture whereby the ambigram coin may be worn as jewelry.

18. The system as recited in claim 1, wherein the displaying device is a suede cord having a first end and a second end, the first end threaded through the opening of the superior aperture and joined to the second end to form a loop whereby the ambigram coin is easily retrieved from inside a pocket.

19. The system as recited in claim 1, wherein the displaying device is a suede cord having a first end and a second end, the first end threaded through the opening of the inferior aperture and joined to the second end to form a loop whereby the ambigram coin is easily retrieved from inside a pocket.

20. The system as recited in claim 1, wherein the displaying device is a dog collar.

21. The system as recited in claim 1, wherein the displaying device is a baby pacifier ribbon.

22. The system as recited in claim 1, wherein the displaying device is a purse.

23. The system as recited in claim 1, wherein the displaying device is a key ring.

24. The system as recited in claim 1, further comprising a connecting device connected to the superior aperture selected from the group comprising a ring, metal ring, clasp, spring clasp, and lobster clasp, whereby the connecting device receives the displaying device.

25. The system as recited in claim 1, further comprising a connecting device connected to the inferior aperture selected from the group comprising a ring, metal ring, clasp, spring clasp, and lobster clasp, whereby the connecting device receives the displaying device.

26. The system as recited in claim 1, wherein the ambigram coin is manufactured using a sturdy material having automatically operable means for rigidly retaining the cut-out hollow ambigram legend.

27. A system, comprising of:
an ambigram coin including a coin body including a solid field portion having an obverse side and a reverse side, bound by a circumferential edge side,
the obverse side having a diameter equal to the diameter of the reverse side;
the circumferential edge side having a thickness $T^1$;
an obverse exterior surface having a surface area equal to a reverse surface area;
the solid field portion rigidly retains a cut-out hollow ambigram legend in a central portion;
the cut-out hollow ambigram legend having at least two cut-out hollow Letters;
a cut-out hollow Letter $L^1$ aligned a distance along the solid field portion from a cut-out hollow Letter $L^2$; being ordered horizontally right to left along the medial x-axis display a first ambigram in a vertical obverse display position such that vertically rotating the coin body a measure of 180 degrees about the medial x-axis to a vertical reverse display position the cut-out hollow ambigram legend has the cut-out hollow letter "$L^1$" and the cut-out letter "$L^2$" being ordered horizontally right to left along the medial x-axis displays a second ambigram;
the cut-out hollow letters "$L^1$" and "$L^2$" each bordered by internal side walls which circumscribe each of the letters "$L^1$" and "$L^2$" are sized to fit in its entirety within the solid field portion of the coin body without extending beyond the edge side;
each of the side walls of the cut-out hollow letter "$L^1$" and the cut-out hollow letter "$L^2$" each having a thickness $T^2$ equal to the thickness $T^1$ of the side edge;
a superior aperture is disposed adjacent to a top edge longitudinally aligned along a y-axis a distance along the solid field portion from an inferior aperture disposed adjacent to a bottom edge such that the superior aperture and the inferior aperture are each disposed separate and remote from the cut-out hollow ambigram legend; and
the superior aperture and the inferior aperture each having an opening with identical size and structure and means by which the coin body is hung from a displaying device.

28. The system as recited in claim 27, wherein the cut-out hollow ambigram legend includes a cut-out hollow letter "M" aligned a distance along the solid field portion from a cut-out hollow letter "E" being ordered horizontally right to left along the medial x-axis in the vertical obverse display position to form the cut-out hollow ambigram "ME" such that the ambigram coin displays the hollow word "ME" to a viewer, the coin body being vertically rotated a measure 180 degrees about the medial x-axis to the vertical reverse display position the cut-out hollow letter "W" and "E" being ordered horizontally right to left along the medial x-axis in the vertical reverse position to form the cut-out hollow ambigram "WE" such that the ambigram coin displays the hollow word "WE" to a viewer.

29. A system, comprising:
an ambigram coin including a coin body including a solid field portion having an obverse side and a reverse side, bound by a circumferential edge side,
the coin body having a medial x-axis and a medial y-axis;
the obverse side having a diameter equal to the diameter of the reverse side;
the circumferential edge side having a thickness $T^1$;
an obverse exterior surface having a surface area equal to a reverse surface area;
the solid field portion rigidly retains a cut-out hollow ambigram legend in a central portion;
the cut-out hollow ambigram legend having a cut-out hollow letter "M" aligned a distance along the solid field portion from a cut-out hollow letter "E" being ordered horizontally right to left along the medial x-axis in a vertical obverse display position to form the cut-out hollow ambigram "ME" such that vertically rotating the coin body a measure of 180 degrees about the medial x-axis to a vertical reverse display position the cut-out hollow ambigram legend has the cut-out hollow letter "W" and the cut-out letter "E" being ordered horizontally right to left along the medial x-axis to form the cut-out hollow ambigram "WE";
the cut-out hollow letters "M" and "E" each bordered by internal side walls which circumscribe each of the letters "M" and "E" are sized to fit in its entirety within the solid field portion of the coin body without extending beyond the edge side;
each of the side walls of the cut-out hollow letter "M" and the cut-out hollow letter "E" each having a thickness $T^2$ equal to the thickness $T^1$ of the side edge;
a right aperture disposed adjacent to a right side edge and longitudinally aligned along an x-axis a distance along the solid field portion from a left aperture which is located adjacent to a left side edge such that the right aperture and the left aperture are each disposed separate and remote from the cut-out hollow ambigram legend;
the right aperture and the left aperture each having an opening with identical size and structure and means by which the ambigram coin is connected to a right vertical rotatable connecting device and a left vertical rotatable connecting device; and
a distal end of the right rotatable connecting device fixed to a first end of the displaying device and a distal end of the left rotatable connecting device fixed to a second end of the displaying device so that the ambigram coin can be displayed in a selected vertical display position.

30. The system as recited in claim 29, wherein the displaying device is a link chain having a first end and a second end with a length of chain therebetween.

31. The system as recited in claim 29, wherein the right vertical rotatable connector pin device including a first pin receptacle and a first eye bolt;
the left rotatable connector pin device including a second pin receptacle and a second eye bolt;
a first eye bolt having a first loop portion and first male threaded shank portion;
a second eye bolt having a second loop portion and second male threaded shank portion;
the first loop portion connected to the right aperture of the ambigram coin and the second loop portion connected to the left aperture of the ambigram coin;
the first pin receptacle including a first cavity including a first female annular threads as a means for compatible vertical rotatable detachment and reattachment to a first male threaded shank of the first eye loop, and the second pin body including a second cavity including a second female annular threads as a means for compatible vertical rotatable detachment and reattachment to a second male threaded shank of the second eye loop so that the ambigram coin may be installed on a displaying device at a selected vertical display position relative to the x-axis in a vertical obverse display position such that the cut-out ambigram "ME" is displayed, and by vertically rotating the ambigram coin in a measure of 180 degrees in the vertical reverse display position such that the cut-out hollow ambigram "WE" is displayed.

32. A method of manufacturing, a product, the method comprising the steps of:

providing a plasma cutter;

providing a computer numerical controlled plasma cutter machine using a plasma torch;

loading a sheet of steel ⅛" thick and up to 4 feet by 4 feet square onto a cutting table of the computer numerical controlled plasma cutter machine;

selecting a computer numerical cutting specifications from a computer assisted design software to perform a plasma cutting function of an ambigram coin comprising:

a coin body including a solid field portion having an obverse side and a reverse side, bound by a circumferential edge side, the coin body having a medial x-axis and a medial y-axis; the obverse side having a diameter equal to a diameter of the reverse side; the circumferential edge side having a thickness $T^1$; an obverse exterior surface having a surface area equal to a reverse exterior surface area; the solid field portion rigidly retains a cut-out hollow ambigram legend in a central portion; the cut-out hollow ambigram legend having a cut-out hollow letter "M" aligned a distance from a cut-out hollow letter "E" being ordered horizontally right to left along the medial x-axis in a vertical obverse display position to form the cut-out hollow ambigram "ME" such that vertically rotating the coin body a measure of a 180 degrees about the medial x-axis to a vertical reverse display position the cut-out hollow ambigram legend has a cut-out hollow letter "W" and the cut-out letter "E" being ordered horizontally right to left along the medial x-axis to form a cut-out hollow ambigram "WE"; the cut-out hollow letters "M" and "E" each bordered by internal side walls which circumscribe each of the letters "M" and "E" are sized to fit in its entirety within the solid field portion of the coin body without extending beyond the edge side; each of the side walls of the cut-out hollow letter "M" and the cut-out hollow letter "E" each having a thickness $T^2$ equal to the thickness $T^1$ of the side edge; two apertures, a superior aperture is disposed adjacent to a top edge longitudinally aligned along a y-axis a distance along the solid field portion from an inferior aperture disposed adjacent to a bottom edge such that the superior aperture and the inferior aperture are each disposed separate and remote from the cut-out hollow ambigram legend; and the superior aperture and the inferior aperture each having an opening with an identical size and structure and means by which the coin body is hung from a displaying device;

selecting a font of the cut-out hollow letters "M" and "E" to form the cut-out hollow ambigram "ME" sizing to fit in their entirety within the central portion of the solid field portion of the ambigram coin body without extending beyond the edge side of the coin body;

programming the font into the computer;

programming the plasma cutter to cut a multiple of ambigram coins at the same time;

blowing compressed air at high speed out of a nozzle;

forming an electric arc through the compressed air from the nozzle to a steel surface being cut, heating the compressed air to a plasma such that the plasma melts the steel surface contemporaneously being cut;

moving the electric arc rapidly to blow a molten metal away from the cut;

cutting out the multiple of ambigram coins from the sheet of steel;

tumbling of the cut-out multiple of ambigram coins with an abrasive media by a tumbler for eight hours;

removing the multiple of ambigram coins from the tumbler;

placing the multiple of ambigram coins on a work surface;

air-blowing the multiple of ambigram coins;

wire-brushing each of the multiple of ambigram coins;

inspecting each of the multiple of ambigram coins;

buffing each of the multiple of ambigram coins' obverse exterior surface and reverse exterior surface; and smoothing each of the multiple of ambigram coins' obverse exterior surface and reverse exterior surface removing impurities, hairlines;

polishing each of the multiple of ambigram coins; and painting each of the multiple of ambigram coins with a clear finish.

33. The method as recited in claim 32, wherein the apertures are a right aperture and an opposing left aperture each having an opening with identical size and structure, the right aperture disposed adjacent to a right side edge and longitudinally aligned along an x-axis a distance along the solid field portion from the left aperture which is located adjacent to a left side edge such that the right aperture and the left aperture each are disposed separate and remote from the cut-out hollow ambigram legend.

34. The method as recited in claim 33, wherein the material used in manufacturing the ambigram coin can be selected from any one of the group comprising wood, plastic, resin, bone or stone, precious minerals, gold, platinum, silver, bronze, copper, brass, nickel, pewter, wrought iron, iron, lead, aluminum, steel and stainless steel, bimetallic, bouillon, alloy, jade, and crystals.

35. The method as recited in claim 33, wherein polishing can include any one of the polishing steps selected from the group powder-coating, polishing, electroplating with silver or gold, chroming, or anodizing to color and harden as with aluminum.

36. The method as recited in claim 33, wherein painting the ambigram coin can include a paint for metal in a clear finish, metallic finish, or a plurality of colors.

37. The ambigram coin as recited in claim 1, wherein the ambigram coin can be manufactured by any one of the methods selected from the group comprising stamping, casting, laser cutting, wood carving, punching, sheering, flame cutting, forging, routing, machining or three-dimensional printing.

38. A kit, comprising:

a at least one ambigram coin comprising:

a coin body including a solid field portion having an obverse side and a reverse side, bound by a circumferential edge side, the coin body having a medial x-axis and a medial y-axis; the obverse side having a diameter equal to the diameter of the reverse side; the circumferential edge side having a thickness $T^1$; an obverse exterior surface having a surface area equal to a reverse surface area; the solid field portion rigidly retains a cut-out hollow ambigram legend in a central portion;

the cut-out hollow ambigram legend having a cut-out hollow letter "M" aligned a distance along the solid field portion from a cut-out hollow letter "E" being ordered horizontally right to left along the medial x-axis in a vertical obverse display position to form the cut-out hollow ambigram "ME" such that vertically rotating the coin body a measure of 180 degrees about the medial x-axis to a vertical reverse display position the cut-out hollow ambigram legend has the cut-out hollow letter "W" and the cut-out letter "E" being ordered horizontally right to left along the medial x-axis to form the cut-out hollow ambigram "WE"; the cut-out hollow letters "M" and "E" bordered by internal side walls which circumscribe each of the letters "M" and "E" are sized to fit in its entirety within the solid field portion of the coin body without extending beyond the edge side;

each of the side walls of the cut-out hollow letter "M" and the cut-out hollow letter "E" each having a thickness $T^2$ equal to the thickness $T^1$ of the side edge;

a superior aperture is disposed adjacent to a top edge longitudinally aligned along a y-axis a distance along the solid field from an inferior aperture disposed adjacent to a bottom edge such that the superior aperture and the inferior aperture are each disposed separate and remote from the cut-out hollow ambigram legend; and the superior aperture and the inferior aperture each having an opening with identical size and structure and means by which the ambigram coin is hung from a displaying device;

at least one displaying as a means to display the ambigram coin;

at least one pocket for maintaining the ambigram coin therein, wherein the displaying device extends therefrom the top edge so that a person can easily retrieve the ambigram coin from the pocket;

a letter authored and signed by a gifting person to a specific recipient person;

a printed gift card including indicia and instructions;

a box for retaining elements, the elements, comprising: the ambigram coin assembled to the displaying device, the printed gift card including indicia and instructions, the letter authored and signed by the gifting person to the specific recipient person, and the pocket.

39. A kit comprising:

a plurality of ambigram coins each of the ambigram coin comprising:

a coin body including a solid field portion having an obverse side and a reverse side, bound by a circumferential edge side, the coin body having a medial x-axis and a medial y-axis; the obverse side having a diameter equal to the diameter of the reverse side; the circumferential edge side having a thickness $T^1$; an obverse exterior surface having a surface area equal to a reverse surface area; the solid field portion rigidly retains a cut-out hollow ambigram legend in a central portion;

the cut-out hollow ambigram legend having a cut-out hollow letter "M" aligned a distance along the solid field portion from a cut-out hollow letter "E" being ordered horizontally right to left along the medial x-axis in a vertical obverse display position to form the cut-out hollow ambigram "ME" such that vertically rotating the coin body a measure of 180 degrees about the medial x-axis to a vertical reverse display position the cut-out hollow ambigram legend has the cut-out hollow letter "W" and the cut-out letter "E" being ordered horizontally right to left along the medial x-axis to form the cut-out hollow ambigram "WE"; the cut-out hollow letters "M" and "E" bordered by internal side walls which circumscribe each of the letters "M" and "E" are sized to fit in its entirety within the solid field portion of the coin body without extending beyond the edge side;

each of the side walls of the cut-out hollow letter "M" and the cut-out hollow letter "E" each having a thickness $T^2$ equal to the thickness $T^1$ of the side edge;

a superior aperture is disposed adjacent to a top edge longitudinally aligned along a y-axis a distance along the solid field portion from an inferior aperture disposed adjacent to a bottom edge such that such that the superior aperture and the inferior aperture are each disposed separate and remote from the cut-out hollow ambigram legend; and the superior aperture and the inferior aperture each having an opening with identical size and structure and means by which the ambigram coin is hung from a displaying device;

a plurality of displaying devices;

a plurality of connecting devices as a means to couple the displaying device to the ambigram coin so that a user can wear the ambigram coin as jewelry;

at least one connecting device for coupling to the anterior aperture whereby the displaying device can be passed therethrough a coupler of the connecting device;

at least one connecting device for coupling to the inferior aperture whereby the displaying device can be passed therethrough a coupler of the connecting device;

a plurality of pockets each of which comprising a fastening means for maintaining the ambigram coin therein, wherein the displaying device extends therefrom the top edge so that a person can easily retrieve the ambigram coin from the pocket;

a plurality of printed gift cards including indicia and instructions;

a plurality of letters written by a gifting person to a variety of recipient persons; and a plurality of boxes for retaining elements, wherein each of the plurality of boxes includes the elements, comprising: the ambigram coin assembled to the displaying device, the printed gift card including indicia and instructions, the letter written by the gifting person, and the pocket.

40. The kit as recited in claim 39, wherein:

each of the ambigram coin including a right aperture disposed adjacent to a right side edge and longitudinally aligned along an x-axis a distance along the solid field portion from a left aperture which is located adjacent to a left side edge such that the right aperture and the left aperture are each disposed remotely from the cut-out hollow ambigram legend; the right aperture and the left aperture each having an opening with identical size and structure and means by which the ambigram coin is connected to a right vertical rotatable connecting device and a left vertical rotatable connecting device; and a distal end of the right rotatable connecting device fixed to a first end of the displaying device and a distal end of the left rotatable connecting device fixed to a second end of the displaying device so that the ambigram coin can be displayed in a selected vertical display position.

\* \* \* \* \*